United States Patent
Sato et al.

(10) Patent No.: US 7,710,065 B2
(45) Date of Patent: May 4, 2010

(54) POWER CONVERSION SYSTEM AND POWER CONVERSION CONTROL METHOD

(75) Inventors: Sho Sato, Yokohama (JP); Kantaro Yoshimoto, Yokohama (JP); Kengo Maikawa, Yokosuka (JP); Yuki Nakajima, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 384 days.

(21) Appl. No.: 11/876,971

(22) Filed: Oct. 23, 2007

(65) Prior Publication Data

US 2008/0258662 A1   Oct. 23, 2008

(30) Foreign Application Priority Data

Nov. 17, 2006   (JP)   .............................. 2006-311857
Oct. 9, 2007    (JP)   .............................. 2007-263365

(51) Int. Cl.
H02P 21/00   (2006.01)
H02M 7/5387  (2007.01)
H02J 1/10    (2006.01)

(52) U.S. Cl. .......................... 318/801; 318/812; 363/71; 307/43

(58) Field of Classification Search .................. 318/34, 318/801–812, 599; 363/41, 71, 98, 132, 363/142; 307/43, 75, 80, 81
See application file for complete search history.

(56) References Cited

U.S. PATENT DOCUMENTS

| | | | |
|---|---|---|---|
| 5,841,645 A * | 11/1998 | Sato | 363/43 |
| 6,005,787 A * | 12/1999 | Mizukoshi | 363/71 |
| 6,969,967 B2 * | 11/2005 | Su | 318/801 |
| 7,049,777 B2 * | 5/2006 | Suzuki | 318/599 |
| 7,122,991 B2 | 10/2006 | Kitajima et al. | |
| 7,183,728 B2 | 2/2007 | Kitajima et al. | |
| 7,368,890 B2 * | 5/2008 | Pande et al. | 318/812 |
| 7,570,008 B2 * | 8/2009 | Inaba et al. | 318/722 |
| 7,586,768 B2 * | 9/2009 | Yoshimoto | 363/71 |
| 7,609,024 B2 * | 10/2009 | Ahmad et al. | 318/811 |
| 2007/0194746 A1 | 8/2007 | Yoshimoto | |

(Continued)

FOREIGN PATENT DOCUMENTS

EP   1615325 A2   1/2006

(Continued)

*Primary Examiner*—Walter Benson
*Assistant Examiner*—Eduardo Colon
(74) *Attorney, Agent, or Firm*—Global IP Counselors, LLP

(57) ABSTRACT

A power conversion system includes first and second voltage sources for driving a multiple-phase AC motor and a control unit. The control unit is configured to compute first and second output voltage command values used to drive the multiple-phase AC motor based on a first output voltage command vector corresponding to the voltage source that is charged and a second output voltage command vector corresponding to the voltage source that is discharged. The first and second output voltage command vectors are determined so that a resultant vector of the first and second output voltage command vectors is coincident with a motor voltage command vector corresponding to a motor voltage command value, and a motor current command vector corresponding to the motor current command value is positioned within an included angle formed between the second output voltage command vector and a negative vector of the first output voltage command vector.

13 Claims, 18 Drawing Sheets

U.S. PATENT DOCUMENTS

2007/0216338 A1* 9/2007 Yoshimoto et al. .......... 318/800
2007/0216339 A1 9/2007 Yoshimoto et al.

FOREIGN PATENT DOCUMENTS

| | | |
|---|---|---|
| JP | S54-119609 A | 9/1979 |
| JP | 2006-033956 | 2/2006 |
| JP | 2006-166588 | 6/2006 |
| JP | 2006-166596 | 6/2006 |
| JP | 2006-166628 | 6/2006 |
| JP | 2006-246617 | 9/2006 |
| JP | 2006-296040 | 10/2006 |
| WO | WO2006/061679 A2 | 6/2006 |

* cited by examiner

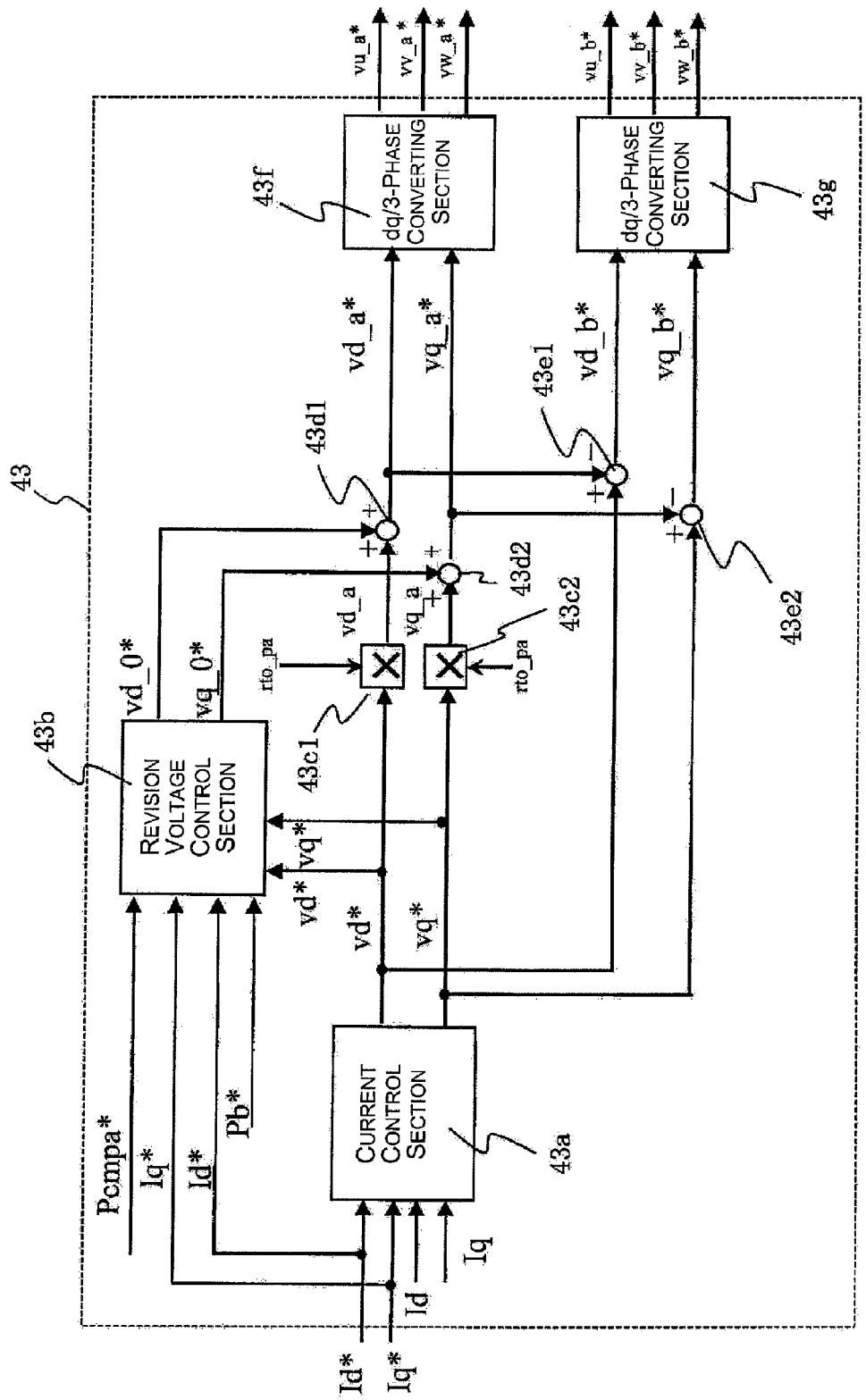
F I G. 3

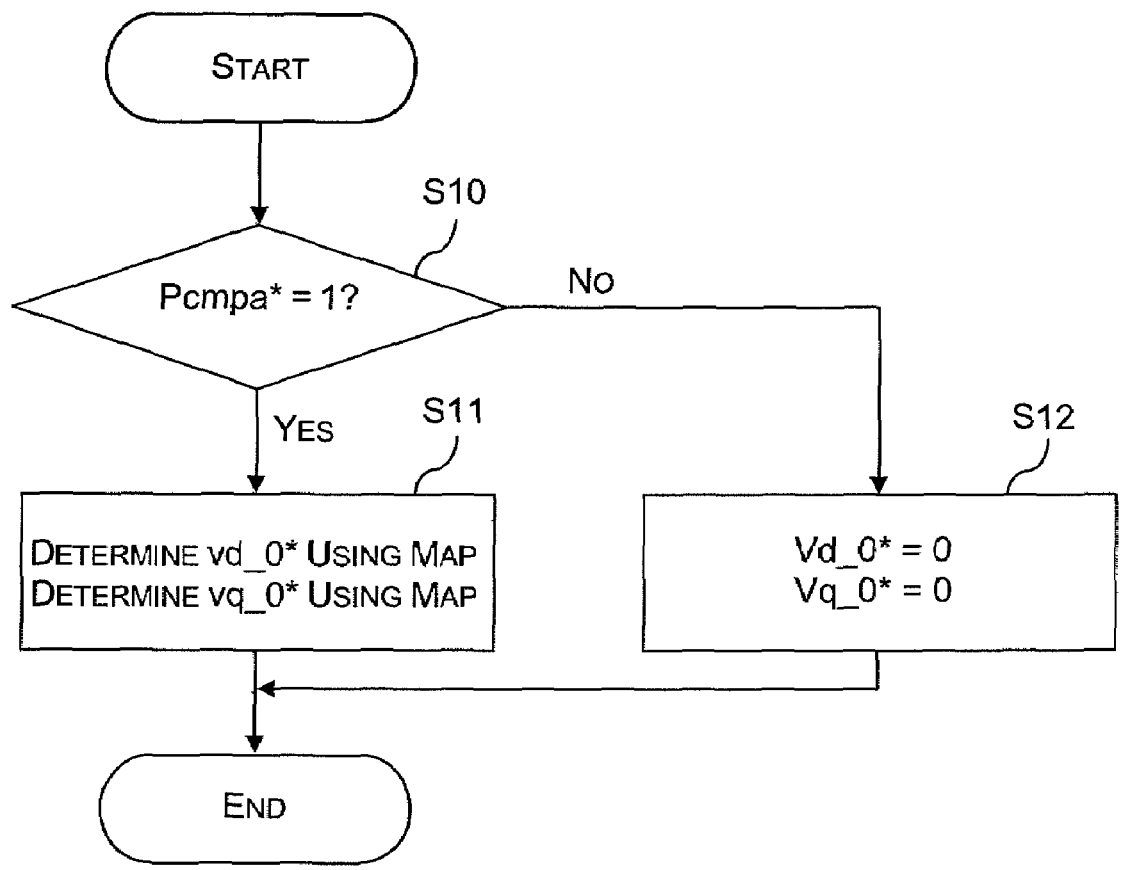
F I G. 4

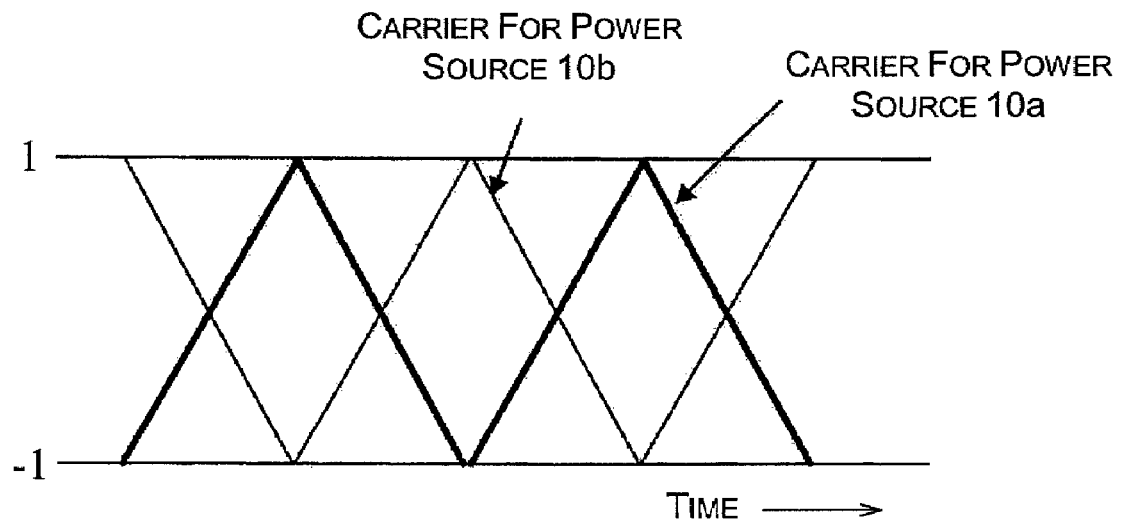
F I G. 10
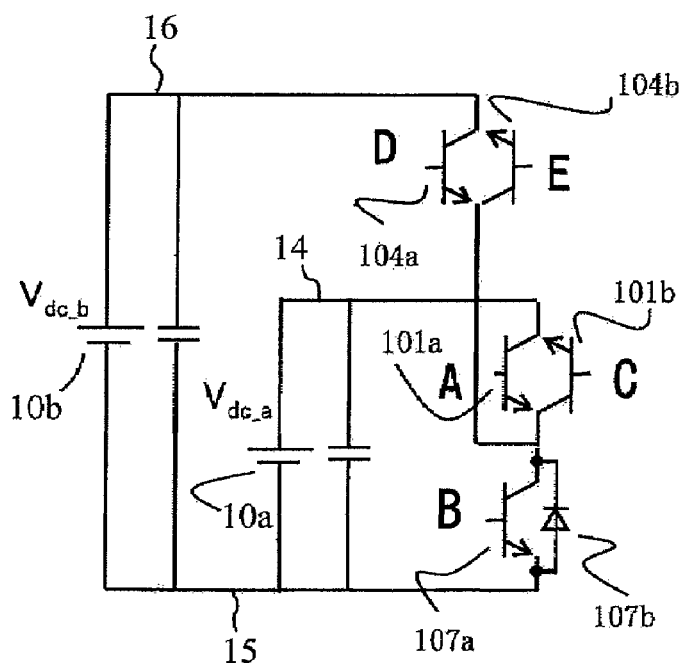
F I G. 11

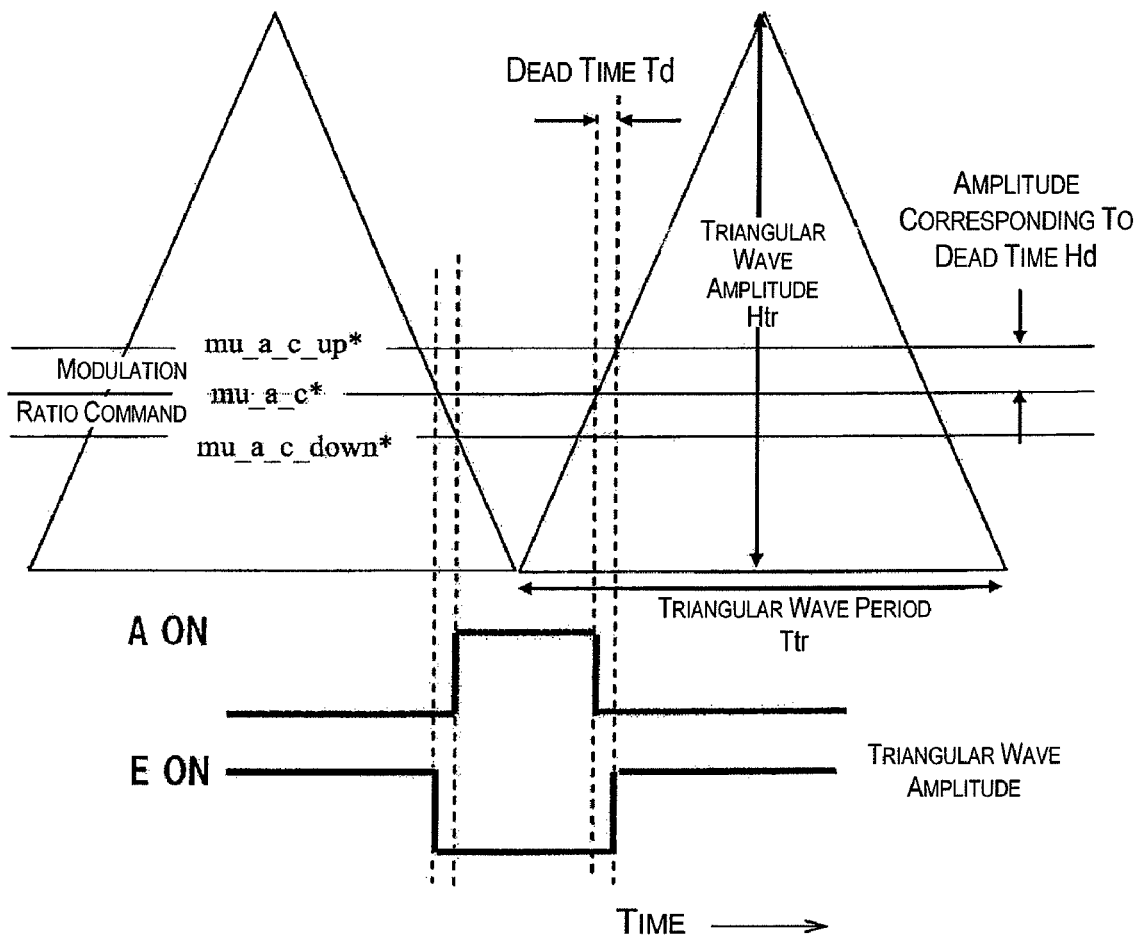
F I G. 12

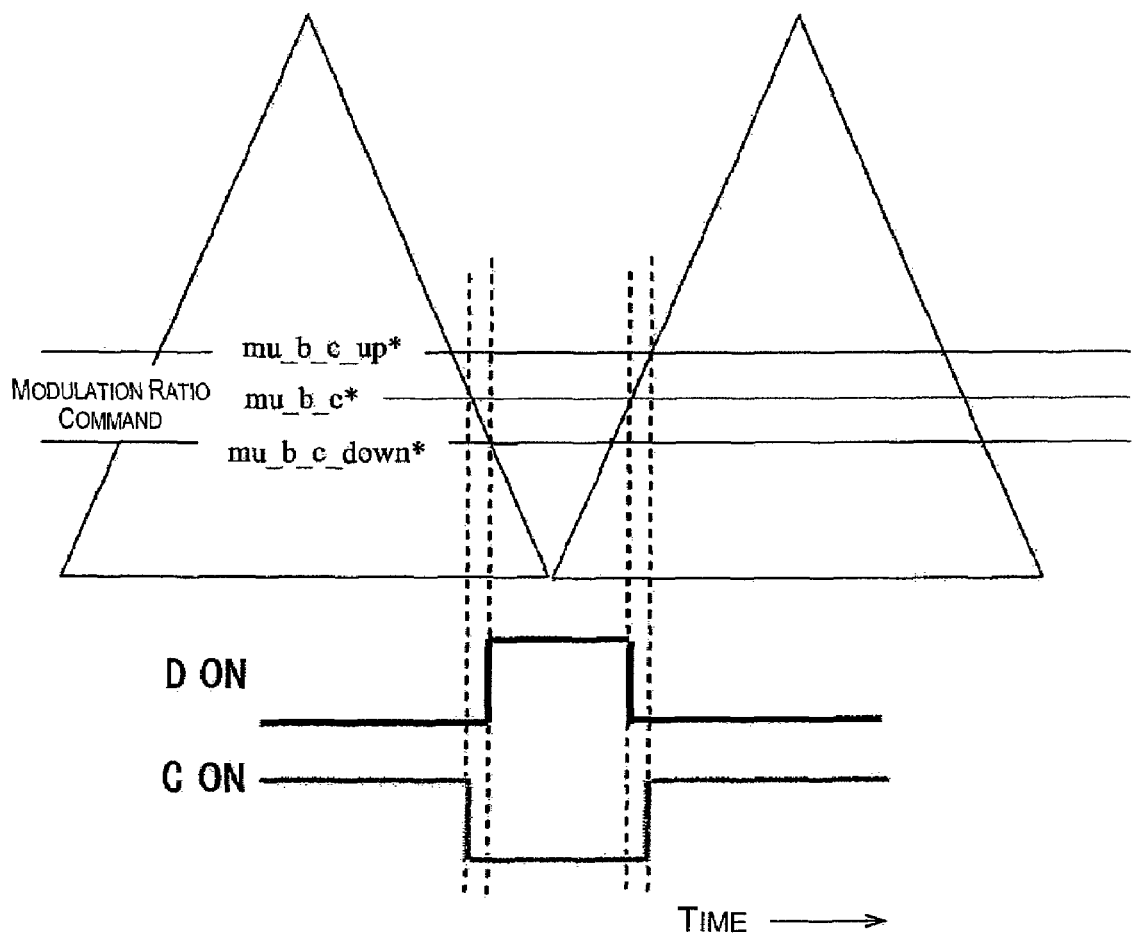
F I G. 13

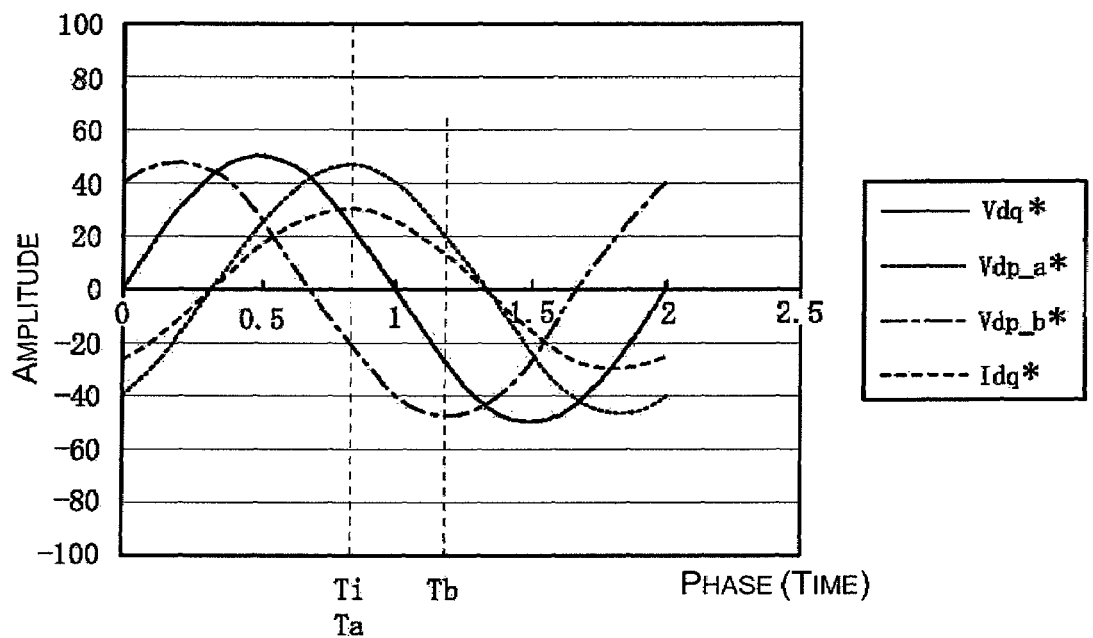
F I G. 19
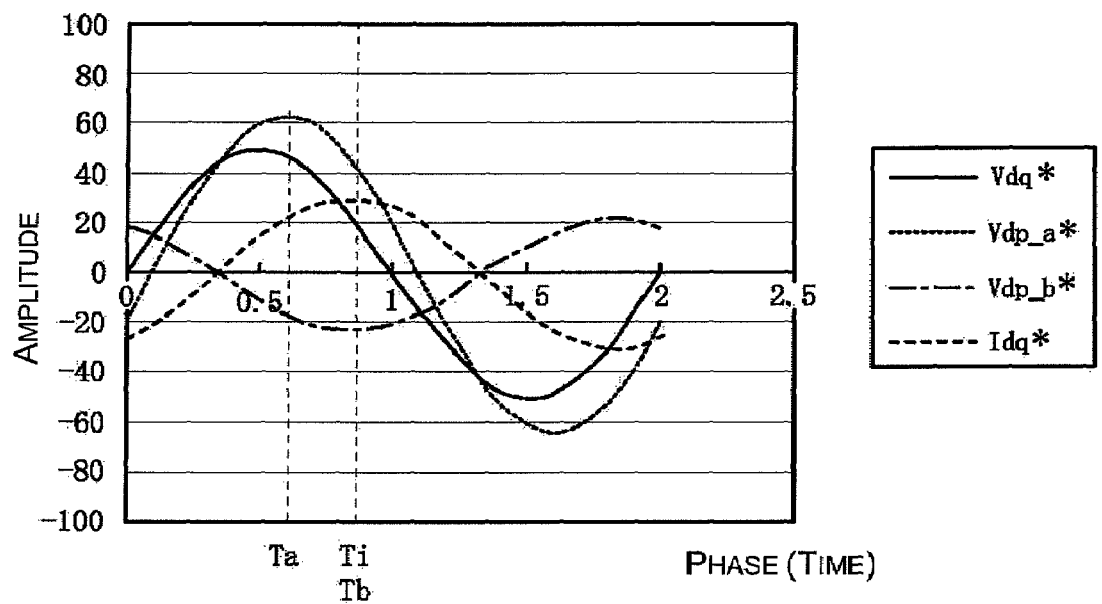
F I G. 20

POWER CONVERSION SYSTEM AND POWER CONVERSION CONTROL METHOD

CROSS-REFERENCE TO RELATED APPLICATIONS

This application claims priority to Japanese Patent Application Nos. 2006-311857 filed on Nov. 17, 2006 and 2007-263365 filed on Oct. 9, 2007. The entire disclosures of Japanese Patent Application Nos. 2006-311857 and 2007-263365 are hereby incorporated herein by reference.

BACKGROUND OF THE INVENTION

1. Field of the Invention

The present invention relates to a power conversion system and a power conversion control method.

2. Background Information

Japanese Laid-Open Patent Application Publication No. 2006-33956 discloses an example of a known motor drive system control apparatus that uses a plurality of power sources that supply electric power to an electric motor and that controls the electric power supplied from each of the power sources to a desired value. With the control apparatus disclosed in this reference, a voltage command value applied to the motor is divided according to the ratio of the distribution target values of the electric power outputted from the power sources to produce a second voltage command value group.

In view of the above, it will be apparent to those skilled in the art from this disclosure that there exists a need for an improved power conversion system and power conversion control method. This invention addresses this need in the art as well as other needs, which will become apparent to those skilled in the art from this disclosure.

SUMMARY OF THE INVENTION

In the motor drive system control apparatus disclosed in the above mentioned reference, the voltage command value applied to the motor is divided into portions in accordance with the ratio indicated by the electric target power distribution values so as to produce a second voltage command value group. Consequently, particularly when power is transferred among the power sources, the power factors of the voltages outputted from the power sources will be poor if the power factors of the current and voltage supplied to the motor are poor. Under such conditions, a larger voltage is required in order to supply a given current, and thus, the efficiency declines.

Therefore, one object of the present invention is to provide a control method for a low-loss electric power converter that can control the electric power supplied from each of a plurality of power sources to a desired value and accomplish transferring of power among the power sources with a high degree of efficiency.

In order to achieve the above object of the present invention, a power conversion system includes a first voltage source, a second voltage source, a multiple-phase alternating current motor, a switch section and a control unit. The switch section is configured to produce an output pulse based on first and second output voltages of the first and second voltage sources, respectively, to drive the multiple-phase alternating current motor. The control unit is configured to control the switch section. The control unit includes a torque computing section, an output voltage command value computing section, and a PWM pulse generating section. The torque computing section is configured to compute a motor current command value and a motor voltage command value that satisfy a motor torque command value. The output voltage command value computing section is configured to compute first and second output voltage command values for the first and second voltage sources, respectively, that satisfy the motor current command value, the motor voltage command value and a target charged power that is set based on conditions of the first and second voltage sources. The PWM pulse generating section is configured to generate a PWM pulse for driving the switch section based on the first and second output voltage command values. The output voltage command value computing section of the control unit is further configured to compute the first and second output voltage command values based on a first output voltage command vector and a second output voltage command vector when the first voltage source is to be charged and the second voltage source is to be discharged. The first output voltage command vector corresponds to the first output voltage command value of the first voltage source satisfying the target charged power. The second output voltage command vector corresponds to the second output voltage command value of the second voltage source. The first and second output voltage command vectors are determined so that a resultant vector of the first and second output voltage command vectors is coincident with a motor voltage command vector corresponding to the motor voltage command value, and a motor current command vector corresponding to the motor current command value is positioned within an included angle formed between the second output voltage command vector and a negative vector of the first output voltage command vector.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 3 is a functional block diagram of a current/power control device in accordance with the first embodiment of the present invention;

FIG. 4 is a flowchart for a revision voltage control executed by the power conversion control system in accordance with the first embodiment of the present invention;

FIG. 10 is a schematic diagram illustrating a triangular waveform used by a PWM pulse generating device in accordance with the first embodiment of the present invention;

FIG. 11 is a partial schematic view of the circuit diagram illustrated in FIG. 1 showing only the circuit corresponding to the U-phase in accordance with the first embodiment of the present invention;

FIG. 12 is a schematic diagram illustrating how the pulse signals A and E are generated by comparing with the triangular waveform in accordance with the first embodiment of the present invention;

FIG. 13 is a schematic diagram illustrating how the pulse signals D and C are generated by comparing with the triangular waveform in accordance with the first embodiment of the present invention;

FIG. 19 is a schematic diagram illustrating the relationships of the motor current and the output voltage command values of the power sources in accordance with the second embodiment of the present invention;

FIG. 20 is a schematic diagram illustrating the relationships of the motor current and the output voltage command values of the power sources in accordance with the second embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
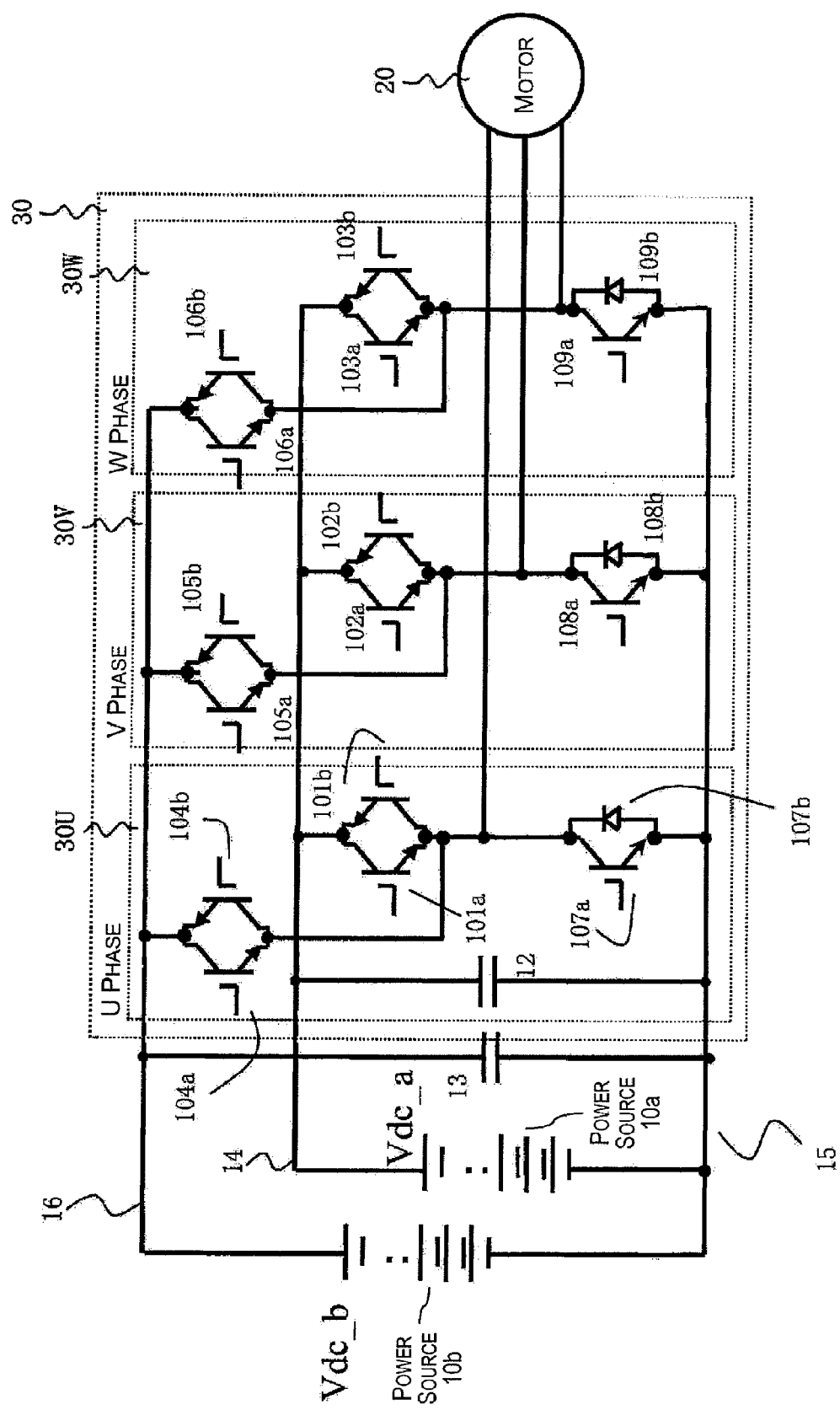
FIG. 1 is a circuit diagram of a power converter in accordance with a first embodiment of the present invention.

FIG. 1 is a circuit diagram of a power converter 30 (switching section) used in a power conversion control system in accordance with the first embodiment of the present invention. As shown in FIG. 1, the power converter 30 is electrically connected between a plurality of power sources 10a and 10b (first and second voltage sources) and a motor 20. The motor 20 is preferably a well-known three-phase AC motor. More specifically, a negative electrode of the power source 10a and a negative electrode of the power source 10b are connected to a common negative bus bar 15. A positive electrode of the power source 10a is connected to a positive electrode bus bar 14 and a positive electrode of the power source 10b is connected to a positive electrode bus bar 16. In the first embodiment, the power source 10b is, for example, a well-known secondary battery that can be selectively charged and discharged, and the power source 10a is, for example, a well-known fuel cell that can be discharged. The present invention is not limited to this arrangement, however, and it is acceptable for the power source 10a to be a secondary battery. The first embodiment of the present invention will be explained chiefly regarding a case in which the power source 10b is charged with electric power from the power source 10a (i.e., the electric power is transferred between the power sources 10a and 10b). Although the illustrated embodiments are explained using an example where the power source 10b is charged and the power source 10a is discharged (i.e., the power source 10b corresponds to the first voltage source to be charged and the power source 10a corresponds to the second voltage source to be discharged in the present invention), it will be apparent to those skilled in the art from this disclosure that the charging/discharging arrangement of the power sources 10a and 10b are not limited to the arrangements described in the illustrated embodiments. In other words, since the power sources 10a and 10b are both capable of charging and discharging electricity, either one of the power sources 10a and 10b can constitute the first voltage source to be charged in the present invention as long as the other one of the power sources 10a and 10b constitutes the second voltage source to be discharged.

As shown in FIG. 1, the power converter 30 includes component sets comprising semiconductor switches 107a, 108a and 109a and diodes 107b, 108b and 109b that are connected between the common negative bus bar 15 and the terminal for each phase of the motor 20, similarly to a lower arm of a conventional inverter. A plurality of semiconductor switches 101a/101b, 102a/102b and 103a/103b arranged to control current flow in both directions is connected between the positive electrode bus bar 14 of the power source 10a and the terminal for each phase of the motor 20. A plurality of semiconductor switches 104a/104b, 105a/105b and 106a/106b arranged to control current flow in both directions is connected between the positive electrode bus bar 16 of the power source 10b and the terminal for each phase of the motor 20. As shown in FIG. 1, a smoothing capacitor 12 is provided between the positive electrode bus bar 14 of the power source 10a and the common negative electrode bus bar 15, and a smoothing capacitor 13 is provided between the positive electrode bus bar 16 of the power source 10b and the common negative electrode bus bar 15.

The power converter 30 is a DC-AC power converting device configured and arranged to produce a voltage to be applied to the motor 20 based on the electric potentials of the common negative electrode bus bar 15, the positive electrode bus bar 14 of the power source 10a, and the positive electrode bus bar 16 of the power source 10b. The semiconductor switches provided with respect to each of the phases U, V, and W of the motor 20 form three switch groups 30U, 30V and 30W, respectively. The switch groups 30U, 30V and 30W serve as switching device that produces voltages to be supplied to the phases of the motor 20. More specifically, the required voltage is supplied to the motor 20 by selectively connecting one of these electric potentials at time and varying the time ratio at which the selected electric potential is connected by controlling the switch groups 30U, 30V and 30W.

Figure 2:
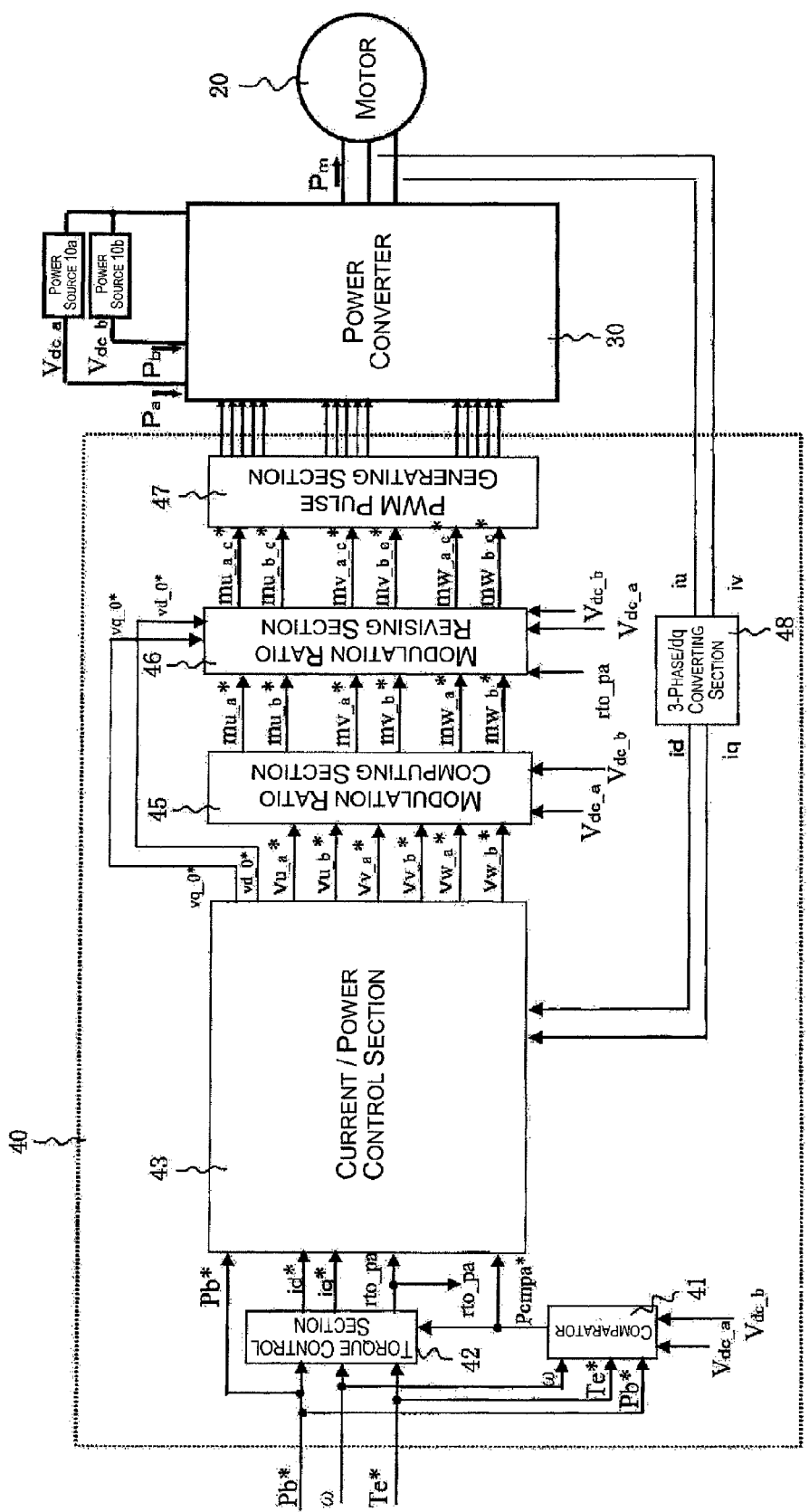
FIG. 2 is a functional block diagram of a power conversion control system in accordance with the first embodiment of the present invention.

Referring now to FIG. 2, the power conversion control system provided with the power converter 30 illustrated in FIG. 1 will be explained in accordance with the first embodiment of the present invention. As shown in FIG. 2, in the power conversion control system in accordance with the first embodiment, the power converter 30 is operatively coupled to a controller 40 (control unit).

The controller 40 preferably includes a microcomputer with a power conversion control program that controls the command values for the power sources 10a and 10b as discussed below. The controller 40 can also include other conventional components such as an input interface circuit, an output interface circuit, and storage devices such as a ROM (Read Only Memory) device and a RAM (Random Access Memory) device. The memory circuit stores processing results and control programs that are run by the processor circuit. The controller 40 is operatively coupled to the various components in a conventional manner. The internal RAM of the controller 40 stores statuses of operational flags and various control data. The internal ROM of the controller 40 stores the maps and data for various operations. The controller 40 is capable of selectively controlling any of the components of the control system in accordance with the control program. It will be apparent to those skilled in the art from this disclosure that the precise structure and algorithms for the controller 40 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause. The controller 40 constitutes a torque computing section including a torque control section 42 and a current control section 43a; an output voltage command value computing section including a revision voltage control section 43b, a pair of multipliers 43c1 and 43c2, a pair of adders 43d1 and 43d2, and a pair of subtractors 43e1 and 43e2; a PWM pulse generating section including a modulation ratio computing section 45, a modulation ratio revising section 46, and a PWM pulse generating section 47; a minimum distributed power computing section and a comparing section including a comparator 41 of the present invention. The constituent features of the controller 40 will now be explained with reference to FIG. 2. The controller 40 includes the comparator 41, the torque control section 42, a current/power control section 43, the modulation ratio computing section 45, the modulation ratio revising section 46, the PWM pulse generating section 47, and a three-phase/dq converting section 48.

The comparator 41 is configured to receive a torque command Te*, a motor rotational speed ω, the voltage Vdc_a of the power source 10a and the voltage Vdc_b of the power source 10b from an external source of the controller 40 and to produce a minimum electric power command value Pmin (minimum distributed power) indicating the minimum electric power that can be received with distributed power control alone. In other words, the minimum electric power command value Pmin corresponds to a minimum electric power value distributed to the power source 10a or 10b according to power distribution control alone. The minimum electric power command value Pmin is a value lying within such a range that neither of the power source modulation ratios produced by the distributed power control exceeds 1 and is a value that can be received at a current value that allows the motor 20 to operate with good efficiency. The comparator 41 is also configured to receive an electric power command value Pb* of the power source 10b. The electric power command value Pb* corresponds to a target charged power that is determined based on conditions of the power sources 10a and 10b and indicates the target power distributed between the power sources 10a and 10b. The minimum power command value Pmin and the electric power command value Pb* of the power source 10b are compared in the comparator 41 to produce a comparison result Pcmpa*. The comparator 41 is configured to output the value 0 when the electric power command value Pb* is larger than the minimum power command value Pmin, and to output the value 1 when the electric power command value Pb* is smaller than the minimum power command value Pmin.

Since the minimum electric power command value Pmin is a command value for the side that receives the electric power, the minimum electric power command value Pmin is represented as a negative value. Thus, the minimum electric power command value Pmin indicates the maximum value in the negative direction. When the result of the comparison of the minimum electric power command value Pmin and the electric power command value Pb* indicates that the electric power command value Pb* is larger than the minimum electric power command value Pmin, the electric power command value Pb* is on a positive side of the minimum electric power command value Pmin and the amount of regenerative charging power demanded is smaller than the amount of regenerative charging power that can be obtained with distributed power control. On the other hand, if the electric power command value Pb* is smaller than the minimum electric power command value Pmin, then the electric power command value Pb* is on a negative side of the minimum electric power command value Pmin and the amount of regenerative charging power demanded is larger than the amount of regenerative charging power that can be obtained with distributed power control.

The torque control section 42 is configured to compute a d-axis current command value id* of the AC motor 20, a q-axis current command value iq* of the AC motor 20, and a target power distribution value rto_pa based on the comparison result Pcmpa* and the torque command Te*, the motor rotational speed ω, and the electric power command value Pb* of the power source 10b obtained from an external source of the controller 40. The torque control section 42 is configured to refer to a preset four-dimensional map having axes for the four factors (i.e., the torque command Te*, the motor rotational speed ω, the electric power command value Pb*, and the comparison result Pcmpa*) and to output the command values id* and iq* and the target power distribution value rto_pa. When the four dimensional map is prepared, it is still effective even if the command value id* for the d-axis current of the AC motor 20 and the command value iq* for the q-axis current of the AC motor 20 are minimum and d-axis and q-axis revision voltage values vd_0* and vq_0* are maximum. However, in order to reduce the amplitudes of the d-axis and q-axis revision voltage values vd_0* and vq_0*, setting the d-axis current command value id* of the AC motor 20 and the q-axis current command value iq* of the AC motor to larger values is more effective from the perspective of suppressing current ripple and reducing copper loss (ohmic loss) of the motor because higher harmonic components are suppressed. In other words, the torque control section 42 is preferably configured to compute the motor current command value (id* and iq*) so that a motor current command vector corresponding to the motor current command value (id* and iq*) is larger than a minimum current command value that satisfies the motor torque command value (torque command Te*) and the target charged power (electric power command value Pb*).

By producing the d-axis and q-axis current command values id* and iq*, and the target power distribution value rto_pa as described above, the current command value is left unchanged when the electric power command value Pb* can be satisfied with a current command value that results in a good motor efficiency and the current command value is increased only when the electric power command value Pb* cannot otherwise be satisfied. As a result, output in accordance with the electric power command can be accomplished while operating the motor 20 in an efficient state. Additionally, since the amplitude of the revision voltage can be reduced, current rippling can be reduced and the motor 20 can be operated in a generally efficient state.

The current/power control section 43 is configured to produce the d-axis and q-axis revision voltage values vd_0* and vq_0* and the three-phase voltage command values vu_a*, vv_a* and vw_a* for the power source 10a and the three-phase voltage command values vu_b*, vv_b* and vw_b* for the power source 10b using the d-axis current command value id*, the q-axis current command value iq*, a d-axis current value id, a q-axis current value iq, the electric power command value Pb* for the power source 10b, the comparison result Pcmpa*, and the target power distribution values (rto_pa and rto-pb) for the power supplied from the power sources 10a and 10b. The target power distribution values rto_pa and rto_pb indicate a ratio of the electric power of the power source 10a and the electric power of the power source 10b corresponding to when the comparison result Pcmpa* is 0 and satisfy the relationship shown below.

$$rto\_pa + rto\_pb = 1$$

Consequently, if one of the electric target power distribution values rto_pa and rto_pb is known, then the other of the electric target power distribution values rto_pa and rto_pb can be calculated using the above relationship.

When the comparison result Pcmpa* is 1 and the power source outputting power is the power source 10a and the power source receiving power is the power source 10b, the electric target power distribution values rto_pa and rto_pb are set as shown below.

$$rto\_pa = 1$$

$$rto\_pb = 0$$

Referring now to FIG. 3, the current/power control section 43 of the controller 40 will now be explained in detail. As shown in FIG. 3, the current/power control section 43 includes the current control section 43a, the revision voltage control section 43b, the multipliers 43c1 and 43c2, the adders 43d1 and 43d2, the subtractors 43e1 and 43e2, a dq/three-phase converter 43f and a dq/three-phase converter 43g.

The current control section 43a is configured to execute PI feedback control and to output a d-axis voltage command value vd* and a q-axis voltage command value vq* such that the current values id and iq follow the current command values id* and iq*. The current values id and iq are calculated by the three-phase/dq converting section 48 shown in FIG. 2 based on the U-phase current iu and the V-phase current iv.

The revision voltage control section 43b is configured to calculate the d-axis and q-axis revision voltage values vd_0* and vq_0* based on the comparison result Pcmpa* and the torque command value Te*, the motor rotational speed ω, and the electric power command value Pb* of the power source 10b received from an external source of the controller 40. The method of calculating the d-axis and q-axis revision voltage values vd_0* and vq_0* will be explained in more detail later.

Assuming the power source that will output electric power is the power source 10a, the d-axis voltage command value vd* and the q-axis voltage command value vq* outputted from the current control section 43a are each multiplied by the distribution target value rto_pa at the multipliers 43c1 and 43c2 so as to calculate the d-axis and q-axis voltage command values vd_a and vq_a for the power source 10a.

$$vd\_a = vd^* \times rto\_pa$$

$$vq\_a = vq^* \times rto\_pa$$

The d-axis and q-axis revision voltage values vd_0* and vq_0* outputted from the revision voltage control section 43b are added to the d-axis and q-axis voltage command values vd_a and vq_a of the power source 10a, respectively, by the adders 43d1 and 43d2 to obtain a final d-axis voltage command value vd_a* and a final q-axis voltage command value vq_a* for the power source 10a.

$$vd\_a^* = vd\_a + vd\_0^*$$

$$vq\_a^* = vq\_a + vq\_0^*$$

On the other hand, a final d-axis voltage command value vd_b* and a final q-axis voltage command value vq_b* of the power source 10b that will receive electric power are calculated by subtracting the final d-axis and q-axis voltage command values vd_a* and vq_a* of the power source 10a from the d-axis and q_axis voltage command values vd* and vq* outputted from the current control section 43a, respectively, using the subtractors 43e1 and 43e2.

$$vd\_b^* = vd^* - vd\_a^*$$

$$vq\_b^* = vq^* - vq\_a^*$$

The dq/three-phase converters 43f and 43g are dq/three-phase converting devices configured to convert d-axis voltage and a q-axis voltage into a three-phase voltage command. In other words, the dq/three-phase converter 43f serves to convert the final d-axis and q-axis voltage command values vd_a* and vq_a* for the power source 10a into the three-phase voltage command values vu_a*, vv_a* and vw_a*. Likewise, the dq/three-phase converter 43g serves to convert the final d-axis and q-axis voltage command values vd_b* and vq_b* for the power source 10b into the three-phase voltage command values vu_b*, vv_b* and vw_b*.

While the preceding paragraphs explain the overall operation of the current/power control section 43, the calculation of the d-axis and q-axis revision voltage values vd_0* and vq_0* will now be explained with reference to FIGS. 4 and 5. FIG. 4 is a basic flowchart for obtaining the d-axis and q-axis revision voltage values vd_0* and vq_0* executed by the revision voltage control section 43b.

As shown in FIG. 4, in the first embodiment of the present invention, the d-axis and q-axis revision voltage values vd_0* and vq_0* are set to 0 (step S12) when the value of the comparison result Pcmpa* is 0 (No in step S10). On the other hand, when the comparison result Pcmpa* is 1 (Yes in step S10), the values vd_0* and vq_0* are found using the preset five-dimensional map having axes corresponding to vd*, vq*, id*, iq*, and Pb* (step S11).

The method of setting the d-axis and q-axis revision voltage values vd_0* and vq_0* will now be explained with reference to the vector diagram shown in FIG. 5. FIG. 5 shows a first output voltage command vector or first vector (indicated as Vdq_b*) corresponding to the output voltage command value Vdq_b* of the power source 10b and a second output voltage command vector or second vector (indicated as Vdq_a*) corresponding to the output voltage command value Vdq_a* of the power source 10a. The output voltage command value Vdq_a* of the power source 10a (the second vector) represents the final d-axis and q-axis voltage command values vd_a* and vq_a* of the power source 10a to which the d-axis and q-axis revision voltage values vd_0* and vq_0*, which were determined by referring to the preset five-dimensional map, have been included. The output voltage command value Vdq_b* of the power source 10b (the first vector) represents the final d-axis and q-axis voltage command values vd_b* and vq_b* of the power source 10b obtained based on the final d-axis and q-axis voltage command values vd_a* and vq_a* of the power source 10a. FIG. 5 also shows a motor current command vector (indicated as Idq*) corresponding to the motor current command value Idq* and a motor voltage command vector (indicated as Vdq*) corresponding to the motor voltage command value Vdq*. The motor current command value Idq* includes the d-axis and q-axis current command values id* and iq*. The motor voltage command value Vdq* includes the d-axis and q-axis voltage command values vd* and vq*.

Figure 5:
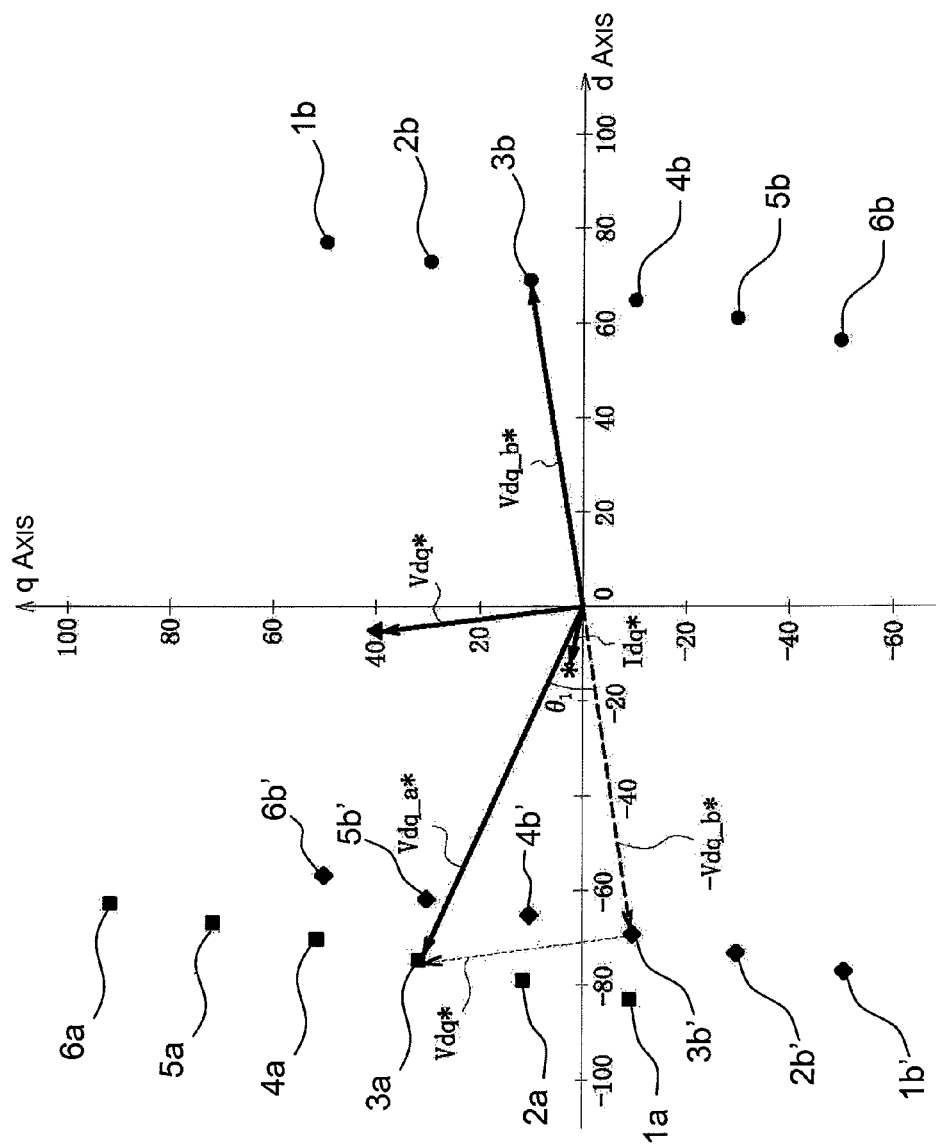
FIG. 5 is a vector diagram illustrating the relationships of output voltage command values and current command values of the power sources in the first embodiment of the present invention.

FIG. 5 shows an example of the first vector (Vdq_b*) and the second vector (Vdq_a*) that satisfy the electric power command value Pb*. A plurality of points 1a to 6a indicated with square dots and a plurality of points 1b to 6b indicated with circular dots in FIG. 5 represent the values that the first vector (Vdq_b*) and the second vector (Vdq_a*) can have in order to satisfy the electric power command value Pb* (the target charged power). Moreover, a plurality of points 1b' to 6b' indicated with diamond-shape dots in FIG. 5 represents the values that correspond to the negative vectors of the values 1b to 6b. As will be explained in more detail later, since the sum of the second vector (Vdq_a*) and the first vector (Vdq_b*) is always required to be equal to the motor voltage command vector (Vdq*), the values that the second vector (Vdq_a*) and the first vector (Vdq_b*) can have are correlated with each other (i.e., 1a-1b (1b'), 2a-2b (2b'), 3a-3b (3b'), . . . ). Of course, the values that the second vector (Vdq_a*) and the first vector (Vdq_b*) can have vary depending on the value of the electric power command value Pb* (the target charged power). As mentioned in the explanation of the overall operation of the current/power control section 43, the d-axis and q-axis revision voltage values vd_0* and vq_0* are values that are added to the d-axis and q-axis voltage command values vd_a and vq_a of the power source 10a in order to obtain the final d-axis and q-axis voltage command values vd_a* and vq_a* of the power source 10a.

In the first embodiment, the following conditions are satisfied when the d-axis and q-axis revision voltage values vd_0* and vq_0* are obtained by using the five-dimensional map: the resultant vector of the second vector (Vdq_a*) and the first vector (Vdq_b*) is coincident with the motor voltage command vector (Vdq*), and the motor current command vector (Idq*) lies within an included angle formed between the second vector (Vdq_a*) and a negative vector (−Vdq_b*) of the first vector (Vdq_b*). The negative vector (−Vdq_b*) of the first vector (Vdq_b*) is a vector having the same point of origin and the same magnitude as the first vector (Vdq_b*) but directed in a 180-degree opposite direction from the first vector (Vdq_b*). The included angle is the smaller angle formed between the second vector (Vdq_a*) and the negative vector (−Vdq_b*) of the first vector (Vdq_b*), and is indicated as θ1 in FIG. 5. More specifically, the d-axis and q-axis revision voltage values vd_0* and vq_0* are determined so that the motor current command vector (Idq*) is equal to a value including a value equal to the second vector (Vdq_a*), a value equal to the negative vector (−Vdq_b*) of the first vector (Vdq_b*), and any value falls within the narrow-angle formed between the second vector (Vdq_a*) and the negative vector (−Vdq_b*) of the first vector (Vdq_b*). After satisfying the aforementioned conditions, the second vector (Vdq_a*) and the first vector (Vdq_b*), with which the sum of the magnitudes of the second vector (Vdq_a*) and the first vector (Vdq_b*) is minimized, are calculated. Then, the difference between the second vector (Vdq_a*) and the motor voltage command vector (Vdq*) is calculated as a revision voltage vector corresponding to a revision voltage command value vdq_0*. The d component and q component of the revision voltage vector (vdq_0*) are outputted as the d-axis and q-axis revision voltage values vd_0* and vq_0*.

Figure 6:
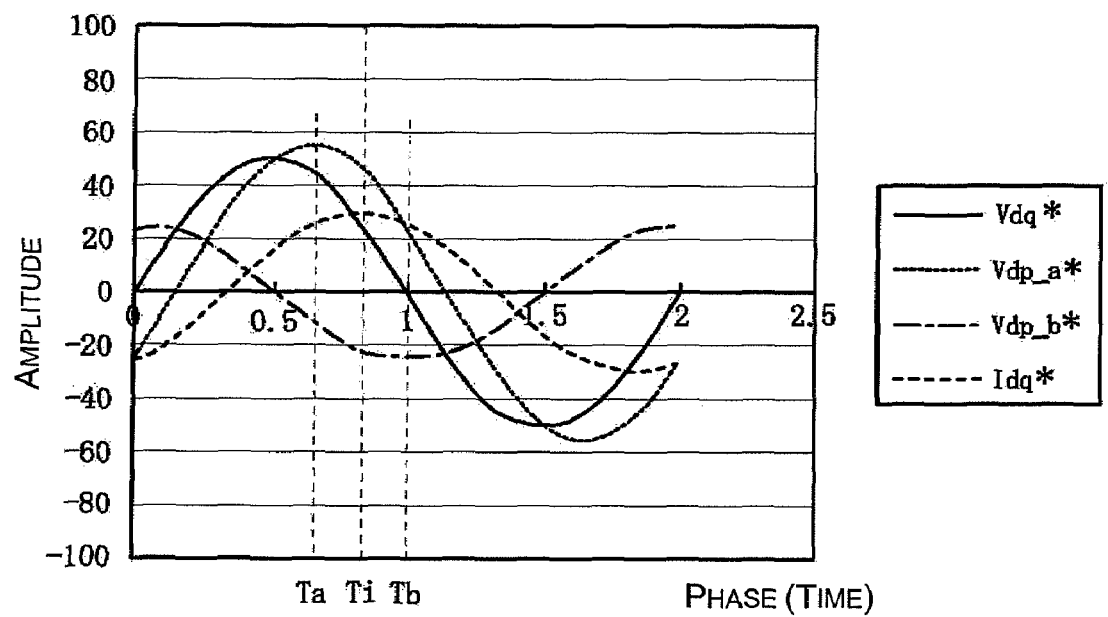
FIG. 6 is a schematic diagram illustrating examples of the waveforms of the motor current and the output voltages of the power sources in accordance with the first embodiment of the present invention.

FIG. 6 illustrates the waveforms corresponding to the motor current command value Idq* (motor current command waveform), the motor voltage command value Vdq* (motor voltage command waveform), the output voltage command value Vdq_a* of the power source 10a (second output voltage command waveform), and the output voltage command value Vdq_b of the power source 10b (first output voltage command waveform) in accordance with the first embodiment of the present invention. The horizontal axis indicates phase (time), and the vertical axis indicates amplitude of voltage or current. The waveforms illustrated in FIG. 6 correspond to the vectors illustrated in the vector diagram of FIG. 5.

Figure 7:
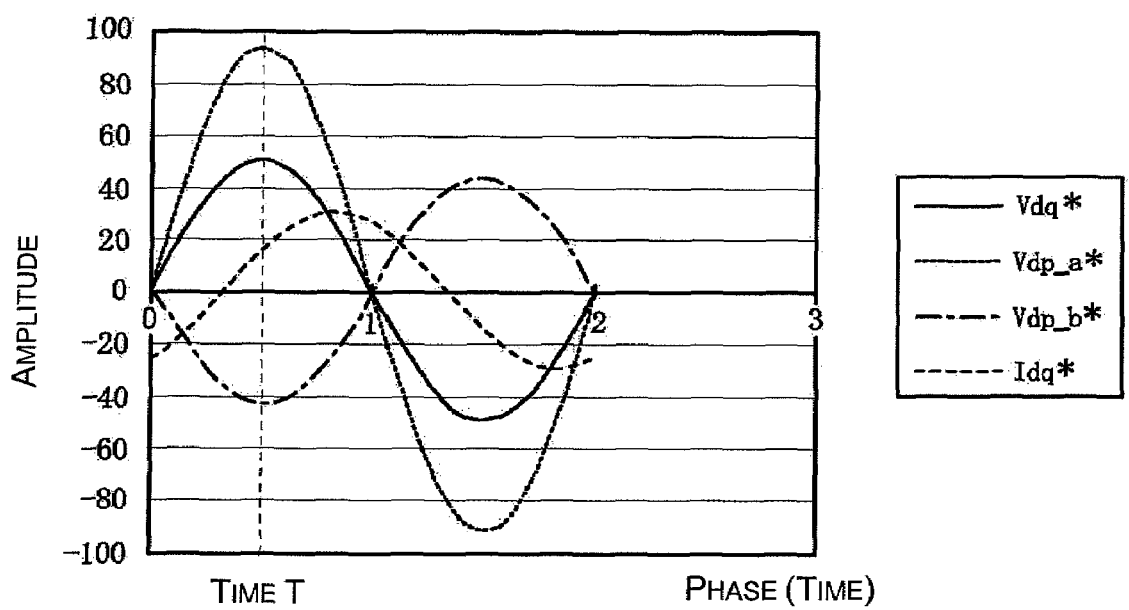
FIG. 7 is a schematic diagram illustrating examples of the waveforms of the motor current and the output voltages of the power sources in the case of a comparative example of a power conversion system.

In order to facilitate the understanding of the present invention, the waveforms of the motor current command value, Idq*, the motor voltage command value Vdq*, the output voltage command value Vdq_a* of the power source 10a, and the output voltage command value Vdq_b* of the power source 10b obtained with a comparative example of a distributed power control are shown in FIG. 7. In FIG. 7, since the positive peak of the motor voltage command waveform (Vdq*), the positive peak of the output voltage command waveform (Vdq_a*) of the output source 10a, and the negative peak (valley) of the output voltage command waveform (Vdq_b*) of the output source 10b are aligned at time T, the power factor of the motor current command waveform (Idq*) and the motor voltage command waveform (Vdq*) is equal to the power factor of the motor current command waveform (Idq*) and the output voltage command waveform (Vdq_a*) of the output source 10a, and the power factor of the motor current command waveform (Idq*) and the output voltage command waveform (Vdq_b*) of the output source 10b. On the other hand, in the first embodiment of the present invention as shown in FIG. 6, an electric power that is calculated based on the motor current command waveform (Idq*) corresponding to the d-axis and q-axis motor current command values id* and iq* and the output voltage command waveform (Vdq_b*) of the power source 10b (which is the power source to be charged) satisfies the electric power command value Pb* of the power source 10b (the target charged power). Moreover, a resultant voltage waveform of the output voltage command waveform (Vdq_b*) of the power source 10b and the output voltage command waveform (Vdq_a*) of the power source 10a (which is the power source to be discharged) is coincident with the motor voltage command waveform (Vdq*) corresponding to the d-axis and q-axis motor voltage command values vd* and vq*. Additionally, the output voltage command waveform (Vdq_a*) of the power source 10a and the output voltage command waveform (Vdq_b*) of the power source 10b are generated such that the positive peak of the motor current command waveform (Idq*), which occurs at time Ti, is sandwiched between the positive peak of the output voltage command waveform (Vdq_a*) of the power source 10a, which occurs at time Ta, and the negative peak (valley) of the output voltage command waveform (Vdq_b*) of the power source 10b, which occurs at time Tb. Thus, the distances between the positive peak of the motor current command waveform (Idq*), the positive peak of the output voltage command waveform (Vdq_a*) of the power source 10a, and the negative peak (valley) of the output voltage command waveform (Vdq_b*) of the power source 10b are smaller than those distances in the comparative example illustrated in FIG. 7. In short, the power factors of the motor current command value Idq* and of the output voltage command values Vdq_a* of the power source 10a and the output voltage command value Vdq_b* of the power source 10b are both improved in comparison with the comparative technology shown in FIG. 7. As shown in FIG. 6, in the first embodiment of the present invention, time Ti occurs within the time interval between time Ta and time Tb. In this explanation, the expressions "sandwiched between" and "positioned (occurring) within the time interval" include cases in which the peak of either the output voltage command waveform (Vdq_a*) of the power source 10a or the output voltage command waveform (Vdq_b*) of the power source 10b coincides with the peak of the motor current command waveform (Idq*).

Referring back to FIG. 2, the modulation ratio computing section 45 is configured to receive the voltage Vdc_a of the power source 10a and the voltage Vdc_b of the power source 10b as input and to produce normalized voltage commands, i.e., momentary modulation ratio commands mu_a*, mu_b*, mv_a*, mv_b*, mw_a*, and mw_b*. The modulation ratio revising section 46 is configured to execute a pre-processing of the momentary modulation ratio commands mu_a*, mu_b*, mv_a*, mv_b*, mw_a*, and mw_b* to produce final momentary modulation ratio commands mu_a_c*, mu_b_c*, mv_a_c*, mv_b_c*, mw_a_c*, and mw_b_c* before pulse width modulation (PWM) is executed. The PWM pulse generating section 47 is configured to produce PWM pulses for turning the switches of the electric power converter 30 on and off based on the final momentary modulation ratio commands mu_a_c* mu_b_c*, mv_a_c*, mv_b_c*, mw_a_c*, and mw_b_c*.

The modulation ratio computing section 45, the modulation ratio revising section 46, and the PWM pulse generating section 47 will now be described in more detail. In the following explanation, the operation is explained with respect to the U phase only. However, the operation is exactly the same with respect to the V phase and W phase, as well.

Modulation Ratio Computing Section 45

The modulation ratio computing section 45 is configured to calculate the momentary modulation ratio command mu_a* for the power source 10a and the momentary modulation ratio command mu_b* for the power source 10b by normalizing the U-phase voltage command vu_a* for the power source 10a and the U-phase voltage command vu_b* for the power source 10b with values equal to one half of the DC voltage of each of the power sources 10a and 10b.

$$mu\_a^* = vu\_a^*/(Vdc\_a/2)$$

$$mu\_b^* = vu\_b^*/(Vdc\_b/2)$$

Modulation Ratio Revising Section 46

Figure 8:
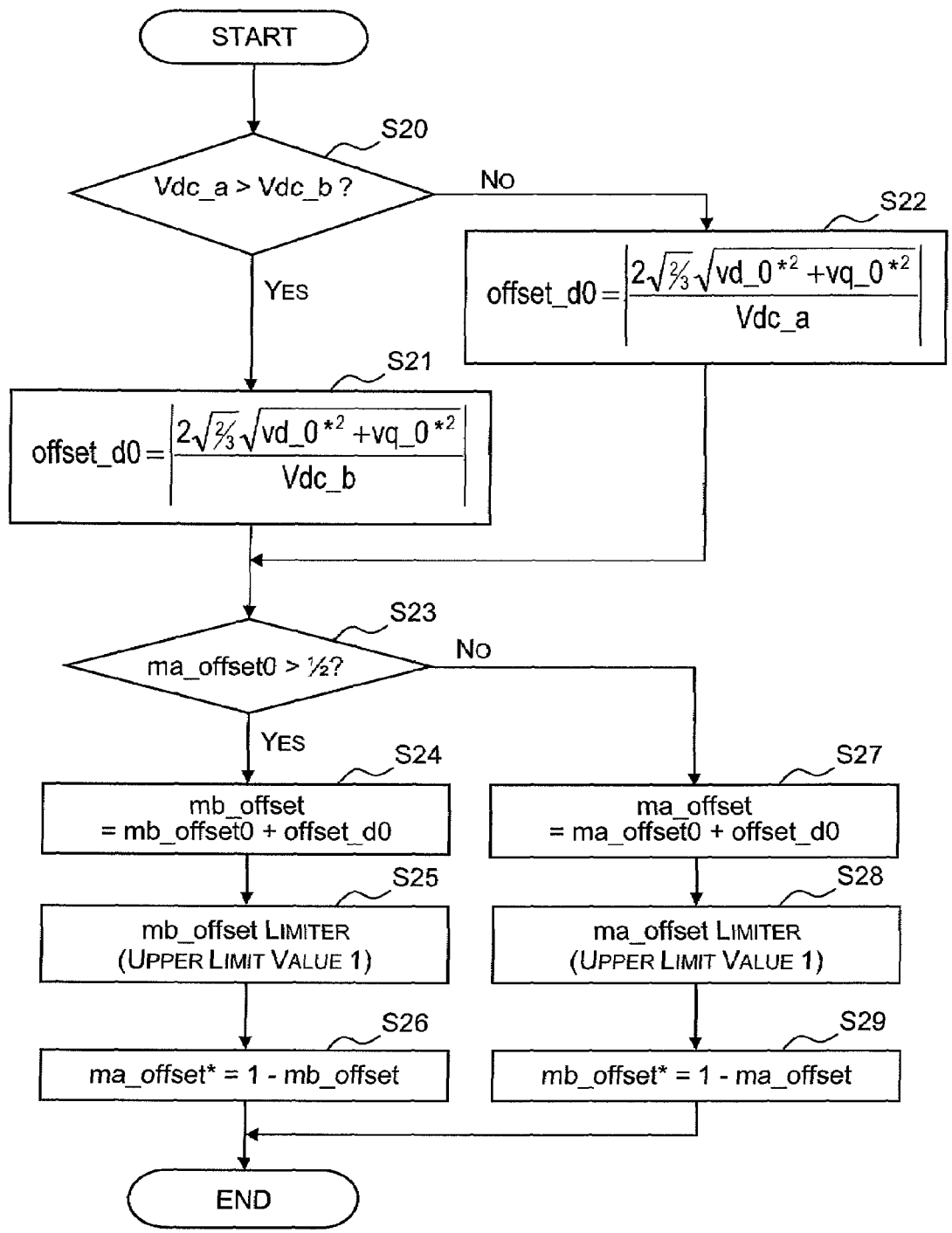
FIG. 8 is a flowchart explaining the revision control of the modulation ratio executed by the power conversion control system in accordance with the first embodiment of the present invention.

The flowchart of FIG. 8 shows the computational operations executed by the modulation ratio revising section 46 in detail. In this computation, the time period of the PWM cycle is distributed in order to output the obtained modulation ratios. First, the values ma_offset0 and mb_offset0 shown below are computed based on the voltages Vdc_a and Vdc_b of the power sources 10a and 10b, respectively. The value rto_pb is calculated using the equation described previously.

$$rto\_pb = 1 - rto\_pa \quad \text{Equation (1)}$$

$$ma\_offset0 = \frac{\left|\frac{rto\_pa}{Vdc\_a}\right|}{\left|\frac{rto\_pa}{Vdc\_a}\right| + \left|\frac{rto\_pb}{Vdc\_b}\right|}$$

$$mb\_offset0 = \frac{\left|\frac{rto\_pb}{Vdc\_b}\right|}{\left|\frac{rto\_pa}{Vdc\_a}\right| + \left|\frac{rto\_pb}{Vdc\_b}\right|}$$

The details will now be explained with reference to FIG. 8. In step S20, the modulation ratio computing section 46 is configured to compare the sizes of the voltages Vdc_a and Vdc_b of the power sources 10a and 10b. After the comparison in step S20, the modulation ratio computing section 46 is configured to compute a value of a modulation ratio amplitude offset_d0 that needs to be secured in order to output the d-axis and q-axis revision voltage values vd_0* and vq_0*. Since the modulation ratio amplitude offset_d0 becomes larger as the voltages Vdc_a and Vdc_b of the power sources 10a and 10b become smaller, the sizes of the voltages Vdc_a and Vdc_b of the power sources 10a and 10b are compared in advance in step S20 in order to secure the required modulation ratio amplitude.

If the value of the voltage Vdc_a of the power source 10a is not larger than the value of the voltage Vdc_b of the power source 10b (No in step S20), then the modulation ratio computing section 46 proceeds to step S22. In step S22, the modulation ratio computing section 46 is configured to calculate the modulation ratio amplitude offset_d0 using the equation (2) below.

$$offset\_d0 = \left|\frac{2\sqrt{\frac{2}{3}}\sqrt{vd\_0^{*2} + vq\_0^{*2}}}{Vdc\_a}\right| \quad \text{Equation (2)}$$

On the other hand, if the value of the voltage Vdc_a of the power source 10a is larger than the value of the voltage Vdc_b of the power source 10b (Yes in step S20), then the modulation ratio computing section 46 proceeds to step S21. In step S21, the modulation ratio computing section 46 is configured to calculate the modulation ratio amplitude offset_d0 using the equation (3) below.

$$offset\_d0 = \left|\frac{2\sqrt{\frac{2}{3}}\sqrt{vd\_0^{*2} + vq\_0^{*2}}}{Vdc\_b}\right| \quad \text{Equation (3)}$$

After calculating the modulation ratio amplitude offset_d0 in step S21 or S22, the modulation ratio computing section 46 proceeds to step S23. In step S23, the modulation ratio computing section 46 is configured to compare the sizes of the value ma_offset0 and the value mb_offset0 that are previously calculated as described above. The modulation ratio computing section 46 is then configured to add the modulation ration amplitude offset_d0 to the smaller one of the values ma_offset0 and mb_offset0 in order to obtain an offset value that will enable the modulation ratio amplitude to be outputted.

More specifically, the values ma_offset0 and mb_offset0 have the following relationship.

$$ma\_offset0 + mb\_offset0 = 1$$

Therefore, the conditional relationship ma_offset0>mboffset0 can be expressed as follows:

$$ma\_offset0 > \tfrac{1}{2}$$

If this condition is satisfied, i.e., if the result of step S23 is Yes (true), then the value mb_offset0 is smaller than the value ma_offset0, and the offset value is calculated by adding the value mb_offset0 to the modulation ratio amplitude offset_d0 in step S24 as follows.

$$mb\_offset = mb\_offset0 + offset\_d0$$

The value of mb_offset is not to exceed 1, and thus, in step S25, the value mb_offset is passed through a limiter having 1 as the upper limit value to obtain the output mb_offset*.

In step S26, the output mb_offset* of the limiter is used to calculate the value ma_offset* using the equation shown below.

$$ma\_offset* = 1 - mb\_offset*$$

On the other hand, if the condition of step S23 is not satisfied, i.e., if the result is No (false), then the value ma_offset0 is smaller than the value mb_offset0, and the offset value is calculated by adding the value ma_offset0 to the modulation ratio amplitude offset_d0 in step S27 as follows.

$$ma\_offset = ma\_offset0 + offset\_d0$$

The value of ma_offset is not to exceed 1, and thus, in step S28, the value ma_offset is passed through a limiter having 1 as the upper limit value to obtain the output ma_offset*.

In step S29, the output ma_offset* of the limiter is used to calculate the value mb_offset* using the equation shown below.

$$mb\_offset* = 1 - ma\_offset*$$

The momentary modulation ratio command mu_a* for the power source 10a and the momentary modulation ratio command mu_b* for the power source 10b are revised using the offset values ma_offset* and mb_offset* to obtain the output values (final momentary modulation ratio commands) mu_a_c* and mu_b_c*.

$$mu\_a\_c* = mu\_a* + ma\_offset* - 1$$

$$mu\_b\_c* = mu\_b* + mb\_offset* - 1$$

Figure 9:
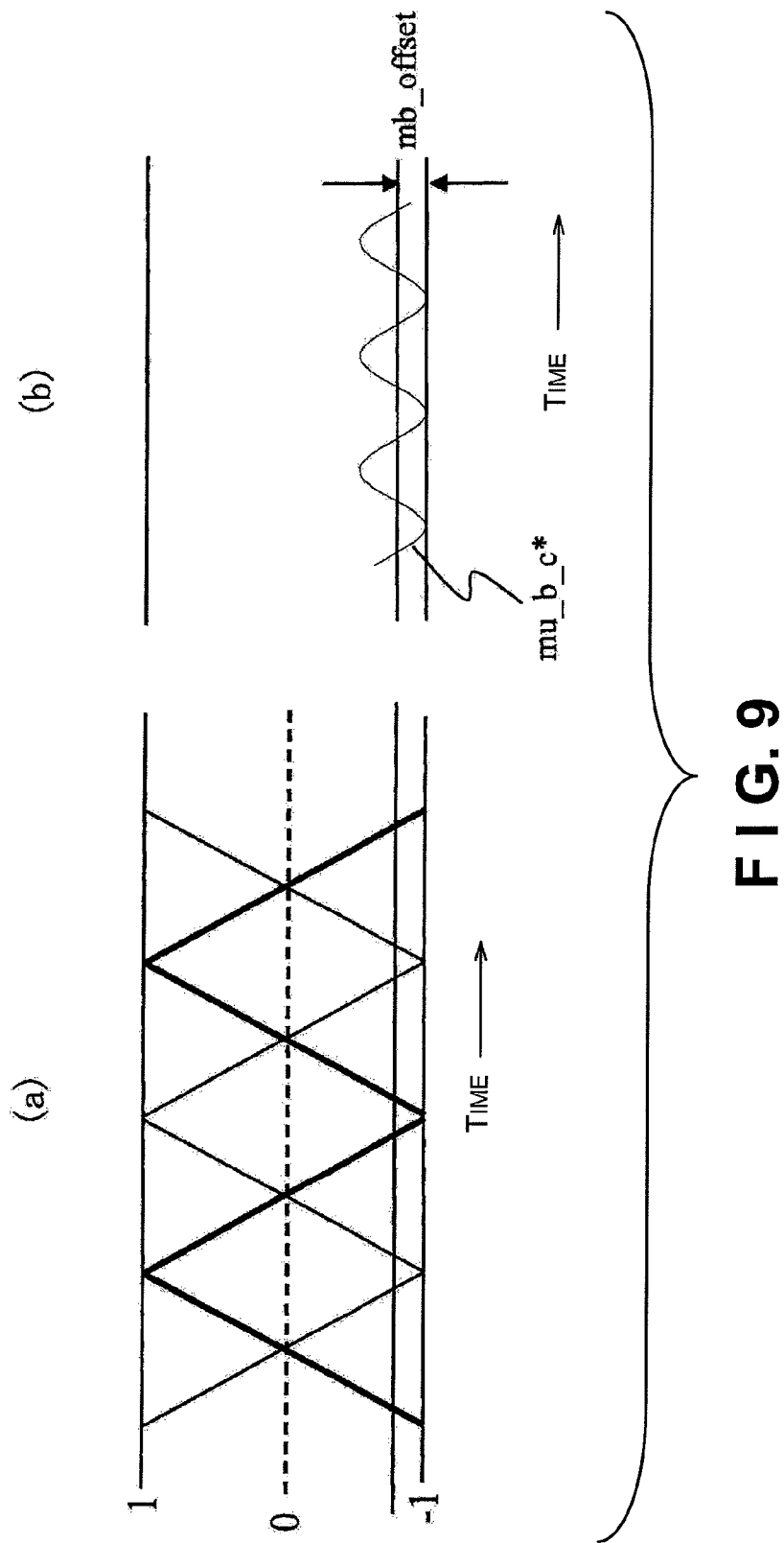
FIG. 9 is a schematic diagram illustrating the relationships of a revision modulation ratio, a modulation ratio, and the triangular waveform in accordance with the first embodiment of the present invention.

Executing this kind of revision calculation enables sufficient time to be secured for outputting the modulation ratio commands when a triangular wave comparison is executed. For example, when rto_pa=1, even though mb_offset0=0, some time for outputting a d-axis revision voltage can be secured because mb_offset includes the added value offset_do. The diagrams (a) and (b) of FIG. 9 show the final momentary modulation ratio commands mu_b_c* and mb_offset in such a case and illustrate how adding the value mb_offset to the momentary modulation ration command mu_b* enables the triangular wave comparison to be accomplished.

PWM Pulse Generating Section 47

The manner in which the PWM pulse generating section 47 generates the PWM pulse will now be explained. As shown in FIG. 10, a carrier wave for the power source 10a is a triangular carrier wave for generating PWM pulses for driving the switches so as to output voltage pulses from the voltage Vdc_a of the power source 10a. Similarly, a carrier for the power source 10b is a triangular carrier wave. These two triangular carrier waves range between an upper limit value of +1 and a lower limit value of −1 and are 180 degrees out of phase with each other. Signals for driving the switches of the U phase are defined as presented below based on FIG. 11.

Signal A: a drive signal for the switch 101a serving to provide an electrical connection for electricity flowing from the power source 10a to an output terminal.

Signal B: a drive signal for the switch 107a serving to provide an electrical connection for electricity flowing from the output terminal to a negative electrode.

Signal C: a drive signal for the switch 101b serving to provide an electrical connection for electricity flowing from the output terminal to the power source 10a.

Signal D: a drive signal for the switch 104a serving to provide an electrical connection for electricity flowing from the power source 10b to an output terminal.

Signal E: a drive signal for the switch 104b serving to provide an electrical connection for electricity flowing from the output terminal to the power source 10b.

The pulse generation method used to produce the voltage pulses from the power source 10a will now be explained. The signal A (the switch 101a) needs to be on in order to output PWM pulses from the voltage source 10a. When a potential difference exists between a positive electrode of the power source 10a and a positive electrode of the power source 10b and the condition Vdc_a>Vdc_b exists, a current that short circuits the positive electrodes of the power sources 10a and 10b will flow if both the signal A and the signal E are turned on (i.e., the switch 101a and 104b are on). For example, if the signal A is switched from on to off and the signal E is switched from off to on simultaneously, then there will be a period of time when both signals are on because it takes time for the signal A to turn completely off and the on states of both switches 101a and 104b will overlap. When this occurs, a short circuit current will flow and the amount of heat emitted from a semiconductor switch installed along the path of the short circuit current will increase. In order to prevent such an increase in emitted heat, the signal A or E being turned from off to on is not switched on until a period of time during which both of the drive signals A and E are off elapses. Thus, the pulses are generated using drive signals that include a short circuit prevention time (dead time). Similarly to the addition of a dead time between the drive signals A and E, a dead time is added between the drive signals E and C. Moreover, in order to prevent short circuiting between the positive electrode and the negative electrode, a dead time is added between the drive signals A and B and the drive signals E and B.

The method of adding a dead time to the drive signals A and E will now be explained with reference to FIG. 12. In order to generate drive signals having a dead time, a value mu_a_c_up* and a value mu_a_c_down* that are offset from the value mu_a_c* by the amount of the dead time are calculated as shown below.

$$mu\_a\_c\_up* = mu\_a\_c* + Hd$$

$$mu\_a\_c\_down* = mu\_a\_c* - Hd$$

The value Hd in the above equations is calculated as shown below based on the amplitude Htr of the triangular waveform (from the base to the apex), the period Ttr of the triangular waveform, and the dead time Td.

$$Hd = 2Td \times Htr / Ttr$$

A comparison of the carrier and the values mu_a_c*, mu_a_c_up*, and mu_a_c_down* is executed and the states of the drive signals of the switches A and E are determined according to the following rules:

If mu_a_c_down*≧the carrier for the power source 10a, then set A=ON;

If mu_a_c_*≦the carrier for the power source 10a, then set A=OFF;

If mu_a_c_*≧the carrier for the power source 10a, then set E=OFF; and

If mu_a_c_up*≦the carrier for the power source 10a, then set E=ON.

By generating the drive signals in this way, a dead time Td can be provided between A and E and short circuiting between the positive electrodes can be prevented.

Similarly, the pulse generation method used to produce the voltage pulses from the power source 10b involves finding the values mu_b_c_up* and mu_b_c_down* using the following equations and comparing to the carrier for the power source 10b. FIG. 13 illustrates the pulse generation of the signals D and C by means of a triangular waveform comparison.

$$mu\_b\_c\_up* = mu\_b\_c* + Hd$$

$$mu\_b\_c\_down* = mu\_b\_c* - Hd$$

The states of the drive signals of the switches D and C are determined according to the following rules:

If mu_b_c_down*≧the carrier for the power source 10b, then set D=ON;

If mu_b_c_*≦the carrier for the power source 10b, then set D=OFF;

If mu_b_c_*≧the carrier for the power source 10b, then set C=OFF; and

If mu_b_c_up*≦the carrier for the power source 10b, then set C=ON.

In this way, a dead time Td can be provided between the signals D and C and short circuiting between the positive terminals can be prevented.

The drive signal B is generated from a logical AND condition of the generated drive signals E and C.

$$B = E \times C$$

Figure 14:
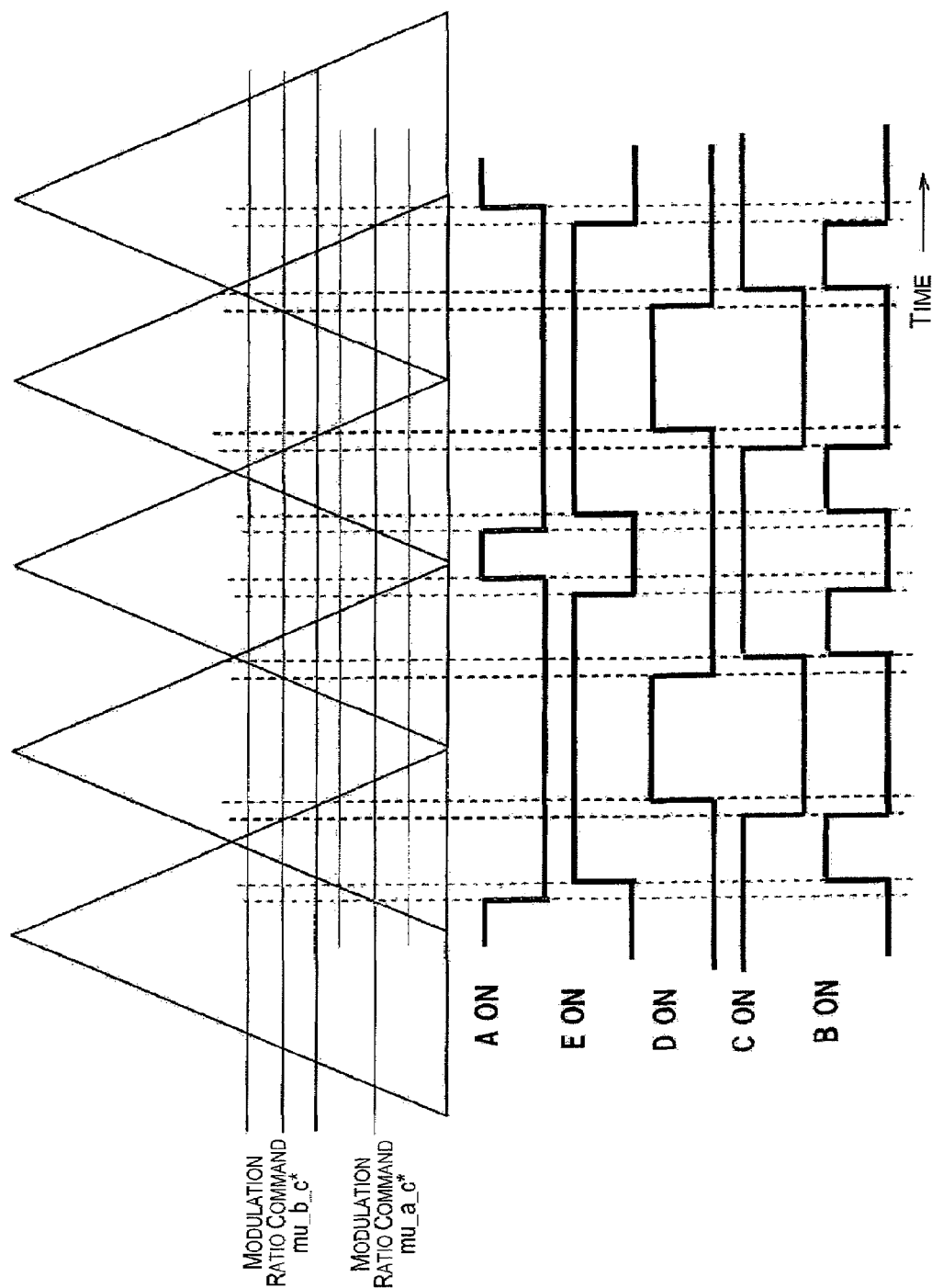
FIG. 14 is a schematic diagram illustrating an example of pulses generated with dead times being added in-between in accordance with the first embodiment of the present invention.

The drive signal E includes a dead time with respect to the drive signal A and the drive signal C includes a dead time with respect to the drive signal D. Thus, since the drive signal B is generated from a logical AND of the drive signals E and C, dead times can also be generated between the drive signals B and A and between the drive signals B and E. An example of pulses generated with dead times in-between is shown in FIG. 14. The output voltage pulses are generated by turning the switches of the electric power converter on and off based on the PWM pulses generated as just described. By taking an average of the voltage pulse produced from the voltage Vdc_a of the power source 10a and the voltage pulse produced from the voltage Vdc_b of the power source 10b in each cycle, a voltage pulse that achieves the original three-phase voltage command values vu*, vv*, and vw* is obtained.

Accordingly, in first embodiment of the present invention described above, when the output voltage command values Vdq_a* and Vdq_b* of the first and second power sources 10a and 10b, and the motor current command value Idq* are expressed as vectors, the revision voltage value vdq_0* is generated such that the motor current command vector (Idq*) is positioned (lies) within the included angle θ1 formed by the first vector (Vdq_b*) and the second vector (Vdq_a*). As a result, the optimum output voltage command values Vdq_a* and Vdq_b* can be selected for each of the power sources 10a and 10b and degradation of the power factors of the motor current command value Idq* and the output voltage command values Vdq_a* and Vdq_b* outputted from each of the power sources 10a and 10b can be reduced.

When electric power is transferred between the power sources 10a and 10b with the power converter 30 under low torque conditions, a feasible method of preventing the motor torque from changing is to increase the ineffective current Id. However, if the current Id is simply increased (particularly when the torque is 0), then there will be a plurality of the output voltage command values Vdq_a* and Vdq_b* that satisfy the current Id (current command value) and the electric power command value Pb*. Therefore, there will be a possibility that the power factors of the motor current command value Idq* and the output voltage command values Vdq_a* and Vdq_b* for the power sources 10a and 10b will decline. Therefore, the present invention is particularly effective under low torque conditions.

Additionally, in the first embodiment of the present invention, since the d-axis and q-axis revision voltage values vd_0* and vq_0* are set such that the sum of the sizes of the output voltage command values Vdq_a* and Vdq_b* for the power sources 10a and 10b is minimized, the amplitudes of the voltages outputted from the power sources 10a and 10b can be minimized and the generation of ineffective power can be reduced, thereby enabling the electric power transfer to be conducted with a high degree of efficiency.

Thus, with the first embodiment of the present invention, electric power transfer between the power sources 10a and 10b can be adjusted by generating the motor current command vector (Idq*), the first vector (Vdq_b*) and the second vector (Vdq_a*) based on the electric power command value Pb* (the target charged power). Although the power of the motor 20 is low when the motor torque command Te* is low, power transfer between the power sources 10a and 10b can be accomplished with good control precision and good efficiency by using the motor current command vector (Idq*), the first vector (Vdq_b*) and the second vector (Vdq_a*) according to the first embodiment of the present invention. Furthermore, since the motor current command vector (Idq*), the first vector (Vdq_b*) and the second vector (Vdq_a*) are generated such that the motor current command vector (Idq*) is located between the second vector (Vdq_a*) and the negative vector (−Vdq_b*) of the first vector (Vdq_b*), power transfer can be accomplished with good power factors and good efficiency.

Second Embodiment

Referring now to FIGS. 15 to 20, a power conversion system in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

Figure 15:
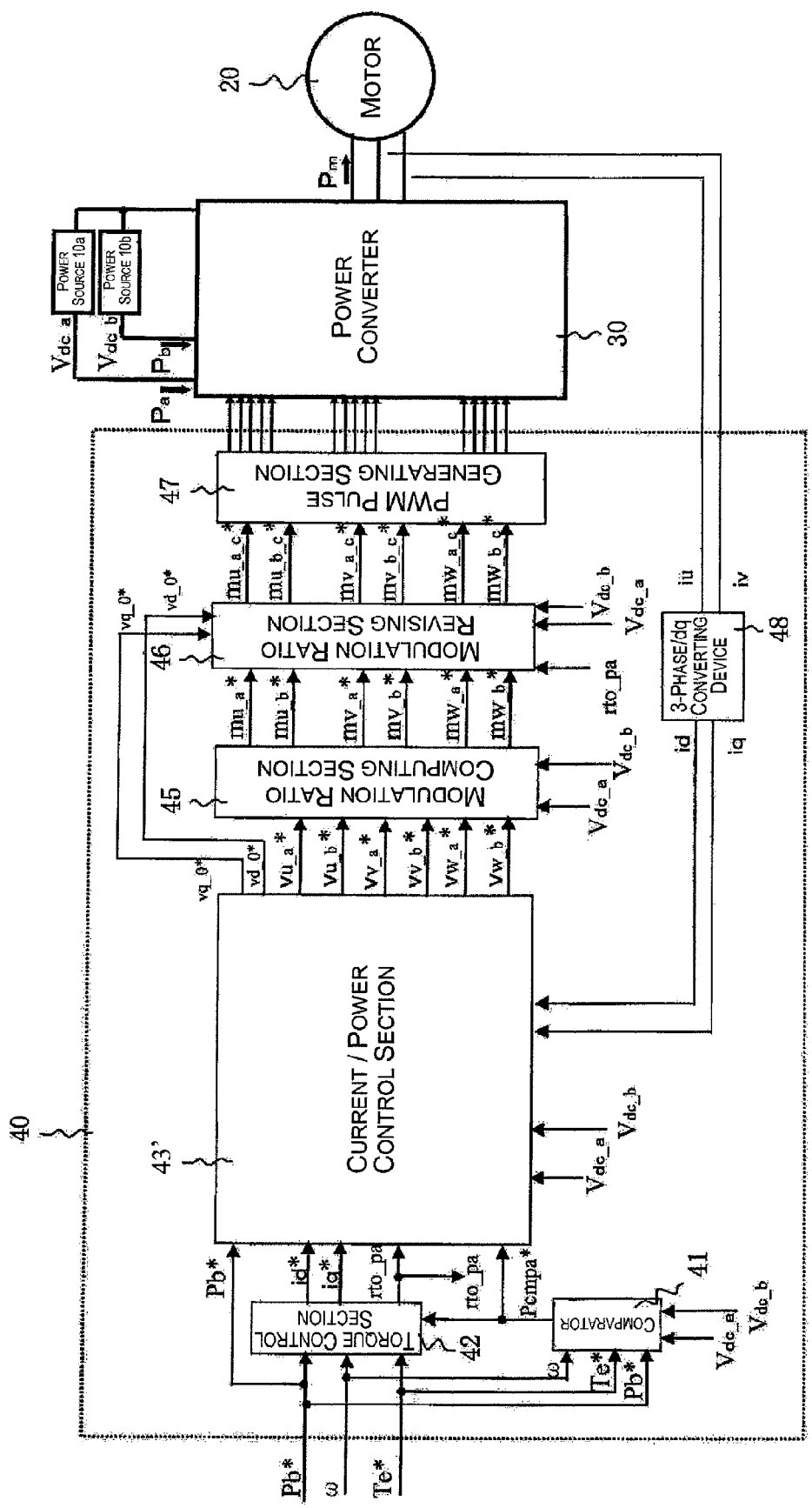
FIG. 15 is a functional block diagram illustrating a power conversion control system in accordance with a second embodiment of the present invention.

FIG. 15 is a functional block diagram of the power conversion system in accordance with the second embodiment of the present invention. As shown in FIG. 15, the power conversion system of the second embodiment is identical to the power conversion system of the first embodiment illustrated in FIG. 2 except for the control executed by a current power control section 43' of the controller 40.

Figure 16:
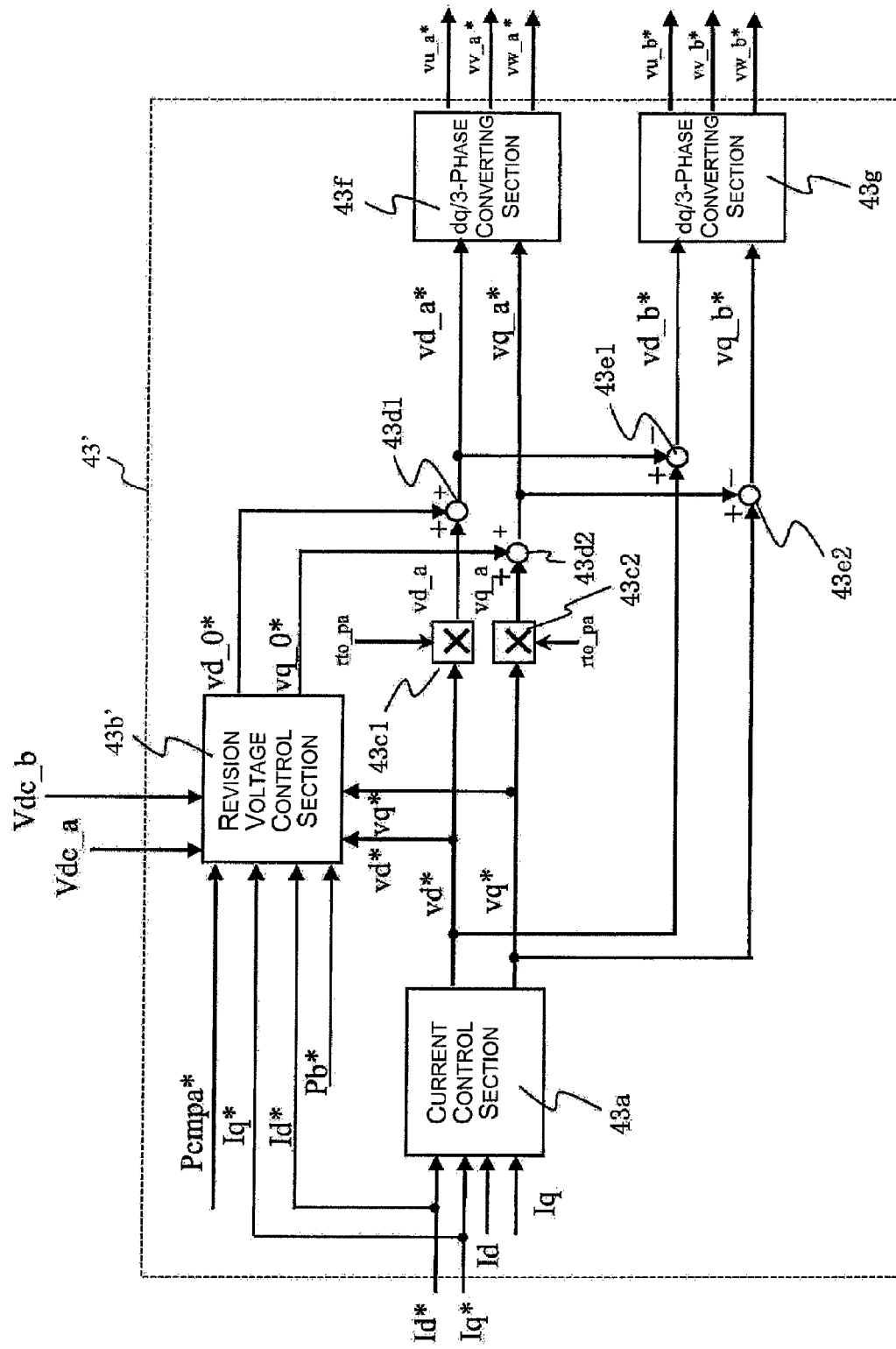
FIG. 16 is a functional block diagram illustrating a current/power control device in accordance with the second embodiment of the present invention.

FIG. 16 is a functional block diagram of the current/power control section 43' of the controller 40 in accordance with the second embodiment. The current/power control section 43' of the second embodiment is identical to the current/power control section 43 of the first embodiment illustrated in FIG. 3 except for the operation executed in a revision voltage control section 43b'. The differences between the first and second embodiments will now be explained with reference to FIG. 16.

The control operation executed in the revision voltage control section 43b' of the second embodiment is basically the same as the control operation shown in the flowchart of FIG. 4. More specifically, the revision voltage control section 43b' is configured to generate the d-axis and q-axis revision voltage values vd_0* and vq_0* based on the comparison result Pcmpa*, the voltage Vdc_a of the power source 10a, the voltage Vdc_b of the power source 10b, the d-axis voltage command value vd*, the q-axis voltage command value vq*, the d-axis current command value id*, the q-axis current command value iq*, and the electric power command value Pb* of the power source 10b.

In step S10 of FIG. 4, the revision voltage control section 43' is configured to determine if the value of the comparison result Pcmpa* is 0 or 1. If the value of the comparison result Pcmpa* is 0 (No in step S10), the d-axis and q-axis revision voltage values vd_0* and vq_0* are set to 0 in step S12. If the value of the comparison result Pcmpa* is 1 (Yes in step S11), then the values vd_0* and vq_0* are determined using a prepared map. In the second embodiment of the present invention, a preset seven-dimensional map having axes corresponding to the voltage Vdc_a, the voltage Vdc_b, the d-axis voltage command value vd*, the q-axis voltage command value vq*, the d-axis current command value id*, the q-axis current command value iq*, and the electric power command value Pb* of the power source 10b is used to determine the d-axis and q-axis revision voltage values vd_0* and vq_0* in step S11.

The seven-dimensional map used in step S11 in the second embodiment is prepared based on the following equation (4). The d-axis and q-axis revision voltage values vd_0* and vq_0* are set such that the modulation ratio mu is minimized.

$$mu = \frac{2 \times \sqrt{\frac{2}{3}} \sqrt{\left(vd^* + \frac{Pb^* - iq^* \times vq\_0^*}{id^*}\right)^2 + (vq^* + vq\_0^*)^2}}{Vdc\_a} + \frac{2 \times \sqrt{\frac{2}{3}} \sqrt{\left(\frac{Pb^* - iq^* \times vq\_0^*}{id^*}\right)^2 + vq\_0^{*2}}}{Vdc\_b}$$

Equation (4)

Figure 17:
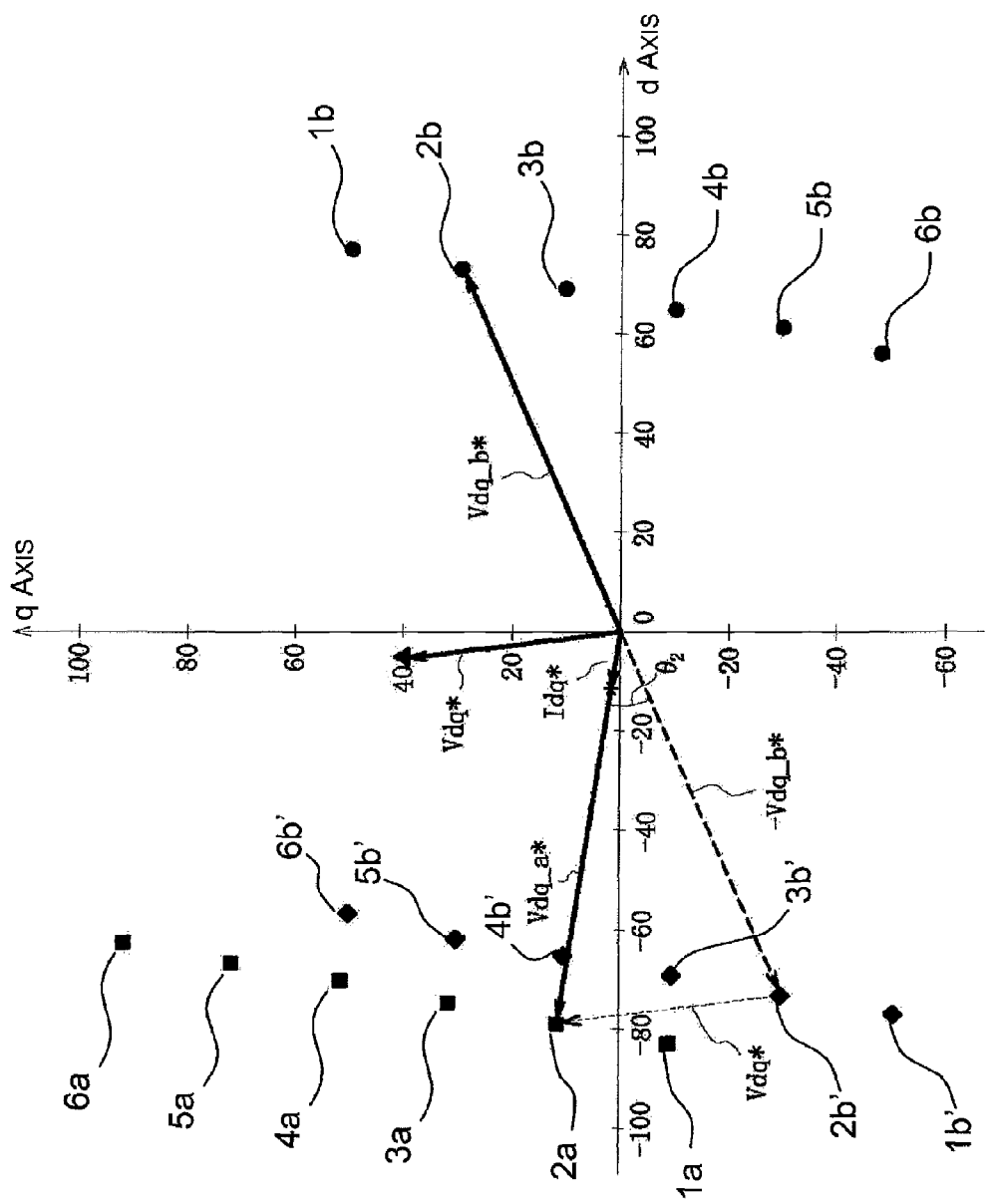
FIG. 17 is a schematic diagram illustrating the relationships of output voltage command values and current command values of the power sources in accordance with the second embodiment of the present invention.
Figure 18:
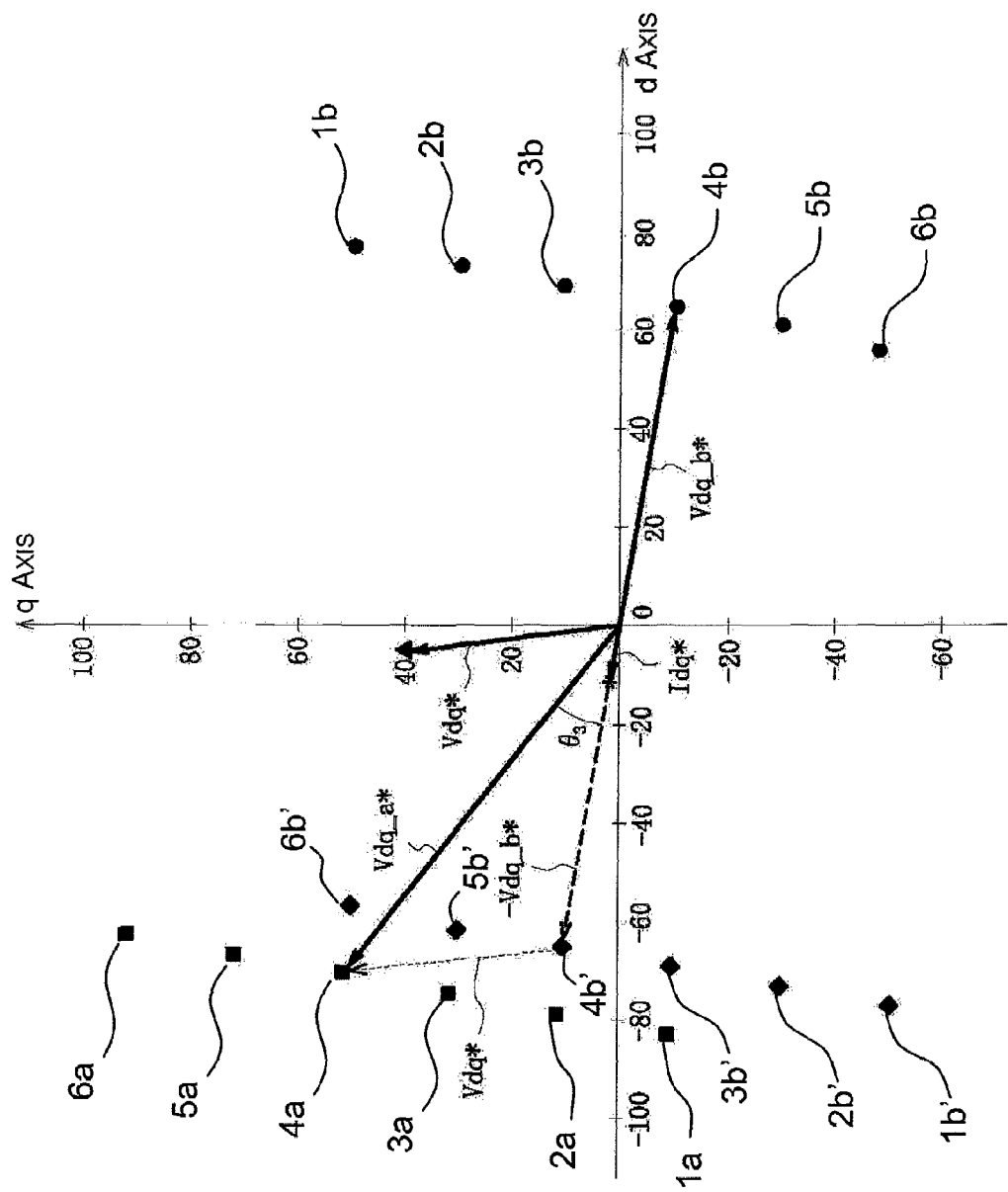
FIG. 18 is a schematic diagram illustrating the relationships of the output voltage command values and the current command values of the power sources in accordance with the second embodiment of the present invention.

The method for setting the d-axis and q-axis revision voltage values vd_0* and vq_0* will now be explained with reference to the vector diagrams shown in FIGS. 17 and 18. On d-q coordinates, FIGS. 17 and 18 show a first vector (indicated as Vdq_b*) corresponding to the output voltage command value Vdq_b* of the power source 10b and a second vector (indicated as Vdq_a*) corresponding to the output voltage command value Vdq_a* of the power source 10a. The output voltage command value Vdq_a* of the power source 10a (the second vector) represents the final d-axis and q-axis voltage command values vd_a* and vq_a* of the power source 10a to which the d-axis and q-axis revision voltage values vd_0* and vq_0*, which were determined by referring to the preset seven-dimensional map, have been added. The output voltage command value Vdq_b* of the power source 10b (the first vector) represents the final d-axis and q-axis voltage command values vd_b* and vq_b* of the power source 10b obtained based on the final d-axis and q-axis voltage command values vd_a* and vq_a* of the power source 10a. The vector diagrams in FIGS. 17 and 18 also show a motor current command vector (indicated as Idq*) corresponding to the motor current command value Idq* and a motor voltage command vector (indicated as Vdq*) corresponding to the motor voltage command value Vdq*. The motor current command value Idq* includes the d-axis and q-axis current command values id* and iq*. The motor voltage command value Vdq* includes the d-axis and q-axis voltage command values vd* and vq*.

In the second embodiment, the following conditions are satisfied on FIGS. 17 and 18 when the d-axis and q-axis revision voltage values vd_0* and vq_0* are obtained using the seven-dimensional map: the resultant vector of the second (Vdq_a*) and the first vector (Vdq_b*) is coincident with the motor voltage command vector (Vdq*), and the motor current command vector (Idq*) lies (exists) within an included angle formed between the second vector (Vdq_a*) and a negative vector (–Vdq_b*) of the first vector (Vdq_b*). The negative vector (–Vdq_b*) of the first vector (Vdq_b*) is a vector having the same point of origin and the same magnitude as the first vector (Vdq_b*) but directed in a 180-degree opposite direction from the first vector (Vdq_b*). The included angle is the smaller angle formed between the first vector (Vdq_a*) and the negative vector (–Vdq_b*) of the first vector (Vdq_b*), and is indicated as θ2 and θ3 in FIGS. 17 and 18, respectively. Upon satisfying the aforementioned conditions, the d-axis and q-axis revision voltage values vd_0* and vq_0* are outputted which minimize the sum mu of the magnitudes of the normalized modulation ratios obtained by normalizing the voltage command values of the power supplies with the power supply voltages.

FIG. 17 is a vector diagram illustrating a case in which the voltage of the power source 10a is lower than the voltage of the power source 10b, the voltage command value outputted by the voltage source 10a has been minimized, and the modulation ratio is at a minimum. The second vector (Vdq_a*) and the first vector (Vdq_b*) are calculated such that the motor current command vector (Idq*) exists (lies) within the included angle θ2 formed between the second vector (Vdq_a*) and the negative vector (–Vdq_b*) of the first vector (Vdq_b*). Moreover, the d-q ratio of the second vector (Vdq_a*) corresponding to the smaller voltage equals the d-q ratio of the motor current command vector (Idq*). The d-axis and q-axis revision voltage values vd_0* and vq_0* are generated (adjusted) from the d-axis and q-axis components of a revision voltage vector vdq_0* that is calculated as a difference between the first vector (Vdq_a*) and the motor voltage command vector (Vdq*).

FIG. 18 is a vector diagram illustrating a case in which the voltage of the power source 10b is lower than the voltage of the power source 10a, the voltage command value outputted by the voltage source 10b has been minimized, and the modulation ratio is at a minimum. The second vector (Vdq_a*) and the first vector (Vdq_b*) are calculated such that the motor current command vector (Idq*) exists (lies) within the included angle θ3 formed between the second vector (Vdq_a*) and the negative vector (–Vdq_b*) of the first vector (Vdq_b*). Moreover, the d-q ratio of the first vector (Vdq_b*) corresponding to the smaller voltage in this case equals the d-q ratio of the motor current command vector (Idq*). The d-axis and q-axis revision voltage values vd_0* and vq_0* are generated (adjusted) from the d-axis and q-axis components of a revision voltage vector vdq_0* that is calculated as a difference between the second vector (Vdq_a*) and the motor voltage command vector (Vdq*). In short, the power factors of the motor current command value Idq* and the output voltage command value Vdq_a* for the power source 10a are best under the conditions shown in FIG. 17. On the other hand, the power factors of the motor current command value Idq* and the output voltage command value—Vdq_b* for the power source 10b are best under the conditions shown in FIG. 18.

FIGS. 19 and 20 illustrate the waveforms corresponding to the motor current command value Idq* (motor current command waveform), the motor voltage command value Vdq* (motor voltage command waveform), the output voltage command value Vdq_a* of the power source 10a (second output voltage command waveform), and the output voltage command value Vdq_b* of the power source 10b (first output voltage command waveform) in accordance with the first embodiment of the present invention. The horizontal axis indicates phase (time), and the vertical axis indicates amplitude of voltage or current.

The waveforms illustrated in FIG. 19 correspond to the vectors illustrated in the vector diagram of FIG. 17. The waveforms illustrated in FIG. 20 correspond to the vectors illustrated in the vector diagram of FIG. 18. Explanations of the relationships between Vdq_a*, Vdq_b*, Pb*, and Vdq* are omitted because they are similar to the first embodiment explained above.

In the example shown in FIG. 19, the distances between the positive peak of the motor current command waveform (Idq*), which occurs at time Ti, the positive peak of the output voltage command waveform (Vdq_a*) of the power source 10a, which occurs at time Ta, and the negative peak (valley) of the output voltage command waveform (Vdq_b*) of the power source 10b, which occurs at time Tb, are smaller than in the example shown in FIG. 7, which illustrates a comparative distributed power control technology. Additionally, the peak of the motor current command waveform (Idq*), which occurs at the time Ti, and the positive peak of the output voltage command waveform (Vdq_a*) of the power source 10a, which occurs at the time Ta, are coincident (occur at the same time). Under the conditions of FIG. 17, control is executed such that a voltage waveform corresponding to the sum of the output voltage command waveform (Vdq_a*) of the power source 10a and the output voltage command waveform (Vdq_b*) of the power source 10b is the motor voltage command waveform (Vdq*), and the positive peak of the motor current command waveform (Idq*) and the positive peak of the output voltage command waveform (Vdq_a*) of the power source 10a occur coincidentally (occur at the same time). Thus, the power factor is improved over the comparative technology and the modulation ratio can be minimized. The output voltage command values Vdq_a* and Vdq_b* for the power sources 10a and 10b are computed such that a sum of modulation ratios calculated based on the output voltage command values Vdq_a* and Vdq_b* of the power sources 10a and 10b and the output voltages of the power sources 10a and 10b is minimized.

In the example shown in FIG. 20, the distances between the positive peak of the motor current command waveform (Idq*), which occurs at time Ti, the positive peak of the output voltage command waveform (Vdq_a*) of the power source 10a, which occurs at time Ta, and the negative peak (valley) of the output voltage command waveform (Vdq_b*) of the power source 10b, which occurs at time Tb, are smaller than in the example shown in FIG. 7, which illustrates a comparative distributed power control technology. Additionally, the positive peak of the motor current command waveform (Idq*) and the negative peak (valley) of the output voltage command waveform (Vdq_b*) of the power source 10b are coincident (occur at the same time). Under the conditions of FIG. 18, control is executed such that a voltage waveform corresponding to the sum of the output voltage command waveform (Vdq_a*) of the power source 10a and the output voltage command waveform (Vdq_b*) of the power source 10b is the motor voltage command waveform (Vdq*), and the positive peak of the motor current command waveform (Idq*) and the negative peak (valley) of the output voltage command waveform (Vdq_b*) of the power source 10b occur coincidentally (at the same time). Thus, the power factor is improved over the prior technology and the modulation ratio can be minimized.

By generating the d-axis and q-axis revision voltage values vd_0* and vq_0* in this way, the optimum output voltage command value can be selected for each of the power sources 10a and 10b and degradation of the power factors of the motor current command value Idq* and the output voltage command values Vdq_a* and Vdq_b* for the power sources 10a and 10b can be reduce. Additionally, since the modulation ratio can be minimized, the current command value can be reduced with respect to a given fixed power command value, thereby suppressing the occurrence of copper loss, and power can be transferred between the power sources 10a and 10b with a higher degree of efficiency. As described above, larger power transfers can be controlled than with the comparative distributed power control because the modulation ratio can be decreased.

Third Embodiment

Figure 21:
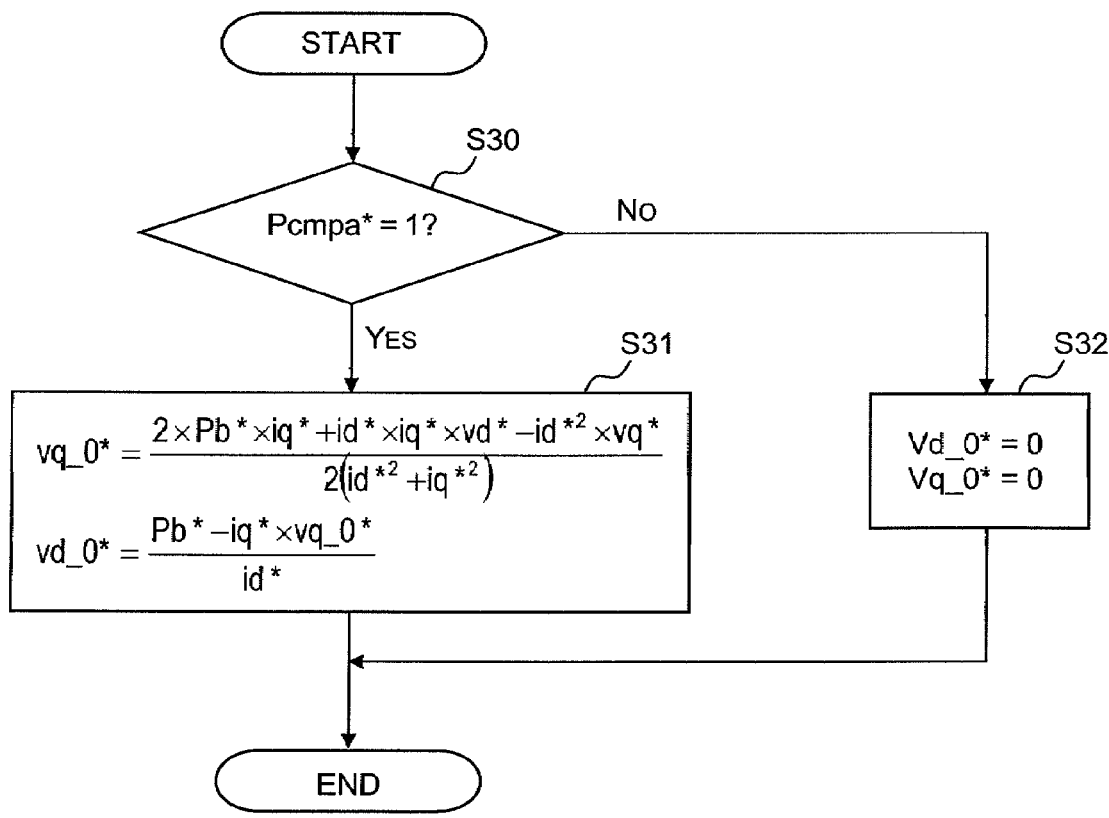
FIG. 21 is a flowchart for a revision voltage control executed by the power conversion control system in accordance with a third embodiment of the present invention.

Referring now to FIG. 21, a power conversion system in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The power conversion system of the third embodiment is identical to the power conversion system of the first embodiment illustrated in FIGS. 2 and 3 except for the control executed by the revision voltage control section 43b of the current/power control section 43. More specifically, in the third embodiment of the present invention, the revision voltage control section 43b of the current/power control section 43 is configured to execute the control operation illustrated in a flowchart of FIG. 21 instead of the control operation illustrated in the flowchart of FIG. 4.

The flowchart for the revision voltage control section 43b executed in the third embodiment of the present invention is shown in FIG. 21. As shown in FIG. 21, in step S30, the revision voltage control section 43b is configured to determine whether the value of the comparison result Pcmpa* is 1 or 0. If the comparison result Pcmpa* is 1 (Yes in step S30), then the revision voltage control section 43b proceeds to step S31. On the other hand, if the value of the comparison result Pcmpa* is 0 (No in step S30), then the revision voltage control section 43b proceeds to step S32.

In step S32, the revision voltage control section 43b is configured to set the values of the d-axis and q-axis revision voltage values vd_0* and vq_0* to 0.

In step S31, the revision voltage control section 43b is configured to generate the d-axis and q-axis revision voltage values vd_0* and vq_0* based on the comparison result Pcmpa*, the d-axis voltage command value vd*, the q-axis voltage command value vq*, the d-axis current command value id*, the q-axis current command value iq*, and the power command value Pb* of the power source 10b. More specifically, the values vd_0* and vq_0* are calculated based on the equations (5) shown below in step S31

$$vq\_0^* = \frac{2 \times Pb^* \times iq^* + id^* \times iq^* \times vd^* - id^{*2} \times vq^*}{2(id^{*2} + iq^{*2})} \quad \text{Equation (5)}$$

$$vd\_0^* = \frac{Pb^* - iq^* \times vq\_0^*}{id^*}$$

The method of deriving the above equations (5) will now be explained. The electric power command value Pb* has the following relationship.

$$Pb^* = id^* \times vd\_0^* + iq^* \times vq\_0^* \quad \text{Equation (6)}$$

Solving the above equation for the revision voltage value vd_0* results in the following equation (7).

$$vd\_0^* = \frac{Pb^* - iq^* \times vq\_0^*}{id^*} \quad \text{Equation (7)}$$

The d-axis and q-axis voltage command values vd_a* and vq_a* of the power source 10a and the d-axis and q-axis voltage command values vd_b* and vq_b* of the power source 10b can be expressed as follows when the power source 10a outputs power and the power source 10b receives the power.

$$vd\_a^* = vd^* \times rto\_pa + vd\_0^*$$

$$vq\_a^* = vq^* \times rto\_pa + vq\_0^*$$

$$vd\_b^* = vd^* - vd\_a^*$$

$$vq\_b^* = vq^* - vq\_a^*$$

Moreover, when the value of the comparison result Pcmpa* is 1, the above equations can be rewritten as follows:

$$vd\_a^* = vd^* + vd\_0^*$$

$$vq\_a^* = vq^* + vq\_0^*$$

$$vd\_b^* = -vd\_0^*$$

$$vq\_b^* = -vq\_0^*$$

When the above conditions are satisfied, a value vq_0α* corresponding to when the power factors of the motor current command vector (Idq*) and a vector corresponding to the output voltage command value Vdq_a* of the power source 10a being the same, i.e., a value vq_0α* that satisfies the relationship id*:iq*=vd_a*:vq_a*, is calculated by using the equation (8) as follows:

$$vq\_0\alpha^* = \frac{Pb^* \times iq^*}{id^{*2} + iq^{*2}} \quad \text{Equation (8)}$$

Next, a value vq_0β* corresponding to when the power factors of the motor current command vector (Idq*) and a negative vector (−Vdq_b*) (vector having the same point of origin and magnitude directed in a 180-degree opposite direction) of a vector corresponding to the output voltage command value Vdq_b* of the power source 10b are the same, i.e., a value vq_0β* that satisfies the relationship id*:iq*=vd_b*:vq_b*, is calculated by using the equation (9) as follows:

$$vq\_0\beta^* = \frac{Pb^* \times iq^* + id^* \times iq^* \times vd^* - id^{*2} \times vq^*}{id^{*2} + iq^{*2}} \quad \text{Equation (9)}$$

The final revision voltage value vq_0* is calculated as the average of vq_0α* and vq_0β* as shown in the equation (5). After calculating the revision voltage value vq_0*, the revision voltage value vd_0* is obtained using the equation (6) above expressing the relationship with respect to the electric power command value Pb*.

$$vq\_0^* = \frac{2 \times Pb^* \times iq^* + id^* \times iq^* \times vd^* - id^{*2} \times vq^*}{2(id^{*2} + iq^{*2})} \quad \text{Equation (5)}$$

$$vd\_0^* = \frac{Pb^* - iq^* \times vq\_0^*}{id^*}$$

The d-axis and q-axis revision voltage values vd_0* and vq_0* are set such that the motor current command vector (Idq*) lies between the second vector (Vdq_a*) and the negative vector (−Vdq_b*) of the first vector (Vdq_b*), where the second vector (Vdq_a*) is a vector whose components on a d-q coordinate system are the d-axis and q-axis voltages vd_a* and vq_a* of the power source that will output power (e.g., the power source 10a in this example), where the first vector (Vdq_b*) is a vector whose components on a d-q coordinate system are the d-axis and q-axis voltages vd_b* and vq_b* of the power source that will receive power (e.g., the power source 10b in this example), the motor current command vector (Idq*) is a vector whose components are the d-axis and q-axis current command values id* and iq*, the motor voltage command vector (Vdq*) is a vector whose components are the d-axis and q-axis voltage command values vd* and vq*, and −Vdq_b* is a negative vector of the first vector (Vdq_b*) (i.e., a vector having the same point of origin and magnitude directed in a 180-degree opposite direction from Vdq_b*). The relationships between these vectors obtained in the third embodiment are the same as the relationships illustrated in the vector diagram of FIG. 5. By producing the d-axis and q-axis revision voltage values vd_0* and vq_0* in this way, the revision voltage commands can be obtained at any time by calculating them with a microcomputer, processor, or other computing means and it is not necessary to depend on a preset map. As a result, power transfers can be accomplished with a high degree of precision.

Although the present invention is explained herein based on drawings and embodiments, it should be recognized that one skilled in the art can readily prepare numerous variations and modifications based on this disclosure. For example, the power conversion system of the present invention can be applied to both direct current and alternating current power sources.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A power conversion system comprising:
a first voltage source;
a second voltage source;
a multiple-phase alternating current motor;
a switch section configured to produce an output pulse based on first and second output voltages of the first and second voltage sources, respectively, to drive the multiple-phase alternating current motor; and
a control unit configured to control the switch section including
a torque computing section configured to compute a motor current command value and a motor voltage command value that satisfy a motor torque command value,
an output voltage command value computing section configured to compute first and second output voltage command values for the first and second voltage sources, respectively, that satisfy the motor current command value, the motor voltage command value and a target charged power that is set based on conditions of the first and second voltage sources, and
a PWM pulse generating section configured to generate a PWM pulse for driving the switch section based on the first and second output voltage command values,
the output voltage command value computing section of the control unit being further configured to compute the first and second output voltage command values based on a first output voltage command vector and a second output voltage command vector when the first voltage source is to be charged and the second voltage source is to be discharged, the first output voltage command vector corresponding to the first output voltage command value of the first voltage source satisfying the target charged power, the second output voltage command vector corresponding to the second output voltage command value of the second voltage source, the first and second output voltage command vectors being determined so that
a resultant vector of the first and second output voltage command vectors is coincident with a motor voltage command vector corresponding to the motor voltage command value, and
a motor current command vector corresponding to the motor current command value is positioned within an included angle formed between the second output voltage command vector and a negative vector of the first output voltage command vector.

2. The power conversion system recited in claim 1, wherein the output voltage command value computing section is configured to compute the first and second output voltage command values based on the first and second output voltage command vectors corresponding to when a sum of magnitudes of the first and second output voltage command vectors is at a minimum value.

3. The power conversion system recited in claim 1, wherein the output voltage command value computing section is configured to compute the first and second output voltage command values such that a sum of modulation ratios calculated based on the first and second output voltage command values of the first and second voltage sources and the output voltages of the first and second voltage sources is minimized.

4. The power conversion system recited in claim 3, wherein the output voltage command value computing section is configured to compute the first and second output voltage command values such that a d-q ratio of the motor current command vector equals a d-q ratio of one of the second output voltage command vector and the negative vector of the first output voltage command vector corresponding to one of the first and second voltage sources having a smaller voltage value.

5. The power conversion system recited in claim 1, wherein the output voltage command value computing section is further configured
to calculate a revision voltage command value based on the motor current command value, the motor voltage command value, and the target charged power by using the following equations:

$$vq\_0^* = \frac{2 \times Pb^* \times iq^* + id^* \times iq^* \times vd^* - id^{*2} \times vq^*}{2(id^{*2} + iq^{*2})}$$

-continued $$vd\_0^* = \frac{Pb^* - iq^* \times vq\_0^*}{id^*}$$

wherein values vq_0* and vd_0* correspond to the revision voltage command value, values id* and iq* correspond to the motor current command value, values vd* and vq* correspond to the motor voltage command value, and a value Pb* corresponds to the target charged power, and to calculate the first and second output voltage command values of the first and second voltage sources based on the revision voltage command values by using the following equations:

$$vd\_a^* = vd^* + vd\_0^*$$

$$vq\_a^* = vq^* + vq\_0^*$$

$$vd\_b^* = -vd\_0^*$$

$$vq\_b^* = -vq\_0^*$$

wherein values vd_a*, vq_a* correspond to the second output voltage command value of the second voltage source and values vd_b* and vq_b* correspond to the first output voltage command value of the first voltage source when the first voltage source is to be charged and the second voltage source is to be discharged.

6. The power conversion system recited in claim 1, wherein the torque computing section is configured to compute the motor current command value such that the motor current command vector is larger than a minimum current command vector that satisfies the motor torque command value and the target charged power.

7. The power conversion system recited in claim 1, wherein the control unit further including
a minimum distributed power computing section configured to compute a minimum distributed power, and
a comparing section configured to compare magnitudes of the minimum distributed power and the target charged power, and
the controller is further configured to change control executed in the torque computing section and the output voltage command value computing section based on a result of comparison obtained in the comparing section.

8. The power conversion system recited in claim 7, wherein the minimum distributed power computing section is configured to compute the minimum distributed power based on a motor rotational speed, the motor torque command value, and the first and second output voltages of the first and second voltage sources.

9. A power conversion system comprising:
a first voltage source;
a second voltage source;
a multiple-phase alternating current motor;
a switch section configured to produce an output pulse based on first and second output voltages of the first and second voltage sources, respectively, to drive the multiple-phase alternating current motor; and
a control unit configured to control the switch section including
a torque computing section configured to compute a motor current command value and a motor voltage command value that satisfy a motor torque command value,
an output voltage command value computing section configured to compute first and second output voltage command values for the first and second voltage sources, respectively, that satisfy the motor current command value, the motor voltage command value and a target charged power that is set based on conditions of the first and second voltage sources, and
a PWM pulse generating section configured to generate a PWM pulse for driving the switch section based on the first and second output voltage command values,
the output voltage command value computing section of the control unit being further configured to compute the output voltage command values, when the first voltage source is to be charged and the second voltage source is to be discharged, such that
an electric power calculated based on a motor current command waveform corresponding to the motor current command value and a first output voltage command waveform corresponding to the first voltage source satisfies the target charged power, and a resultant voltage waveform of the first output voltage command waveform corresponding to the first voltage source and a second output voltage command waveform corresponding to the second voltage source is coincident with a motor voltage command waveform corresponding to the motor voltage command value, and
a location point of a positive peak of the motor current command waveform is positioned within time interval ranging from a location point of a negative peak of the first output voltage command waveform to a location point of a positive peak of the second output voltage command waveform existing within one period of the motor current command waveform.

10. The power conversion system recited in claim 9, wherein
the output voltage command computing section is configured to compute the output voltage command values such that a sum of an amplitude of the first output voltage command waveform and an amplitude of the second output voltage command waveform is minimized.

11. The power conversion system recited in claim 9, wherein
the output voltage command computing section is further configured
to synchronize a phase of the second output voltage command waveform and a phase of the motor current command waveform with each other when the first output voltage of the first voltage source is larger than the second output voltage of the second voltage source, and
to shift the first output voltage command waveform and the motor current command waveform to be out of phase with each other by one-half of a period when the first output voltage of the first voltage source is smaller than the second output voltage of the second voltage source.

12. A power conversion control method comprising:
outputting a first output voltage by a first voltage source;
outputting a second output voltage by a second voltage source;
driving a multiple-phase alternating current motor by using at least one of the first and second output voltages by producing an output pulse based on the first and second output voltages of the first and second voltage sources, respectively; and controlling the output pulse for driving the multiple-phase alternating current motor by
  computing a motor current command value and a motor voltage command value that satisfy a motor torque command value,
  computing first and second output voltage command values for the first and second voltage sources, respectively, that satisfy the motor current command value, the motor voltage command value and a target charged power that is set based on conditions of the first and second voltage sources, and
  generating a PWM pulse for producing the output pulse based on the first and second output voltage command values,
the computing of the first and second output voltage command values including computing the first and second output voltage command values based on a first output voltage command vector and a second output voltage command vector when the first voltage source is to be charged and the second voltage source is to be discharged, the first output voltage command vector corresponding to the first output voltage command value of the first voltage source satisfying the target charged power, the second output voltage command vector corresponding to the second output voltage command value of the second voltage source, the first and second output voltage command vectors being determined so that
  a resultant vector of the first and second output voltage command vectors is coincident with a motor voltage command vector corresponding to the motor voltage command value, and
  a motor current command vector corresponding to the motor current command value is positioned within an included angle formed between the second output voltage command vector and a negative vector of the first output voltage command vector.

13. A power conversion control method comprising:
outputting a first output voltage by a first voltage source;
outputting a second output voltage by a second voltage source;
driving a multiple-phase alternating current motor by using at least one of the first and second output voltages by producing an output pulse based on the first and second output voltages of the first and second voltage sources, respectively; and
controlling the output pulse for driving the multiple-phase alternating current motor by
  computing a motor current command value and a motor voltage command value that satisfy a motor torque command value,
  computing first and second output voltage command values for the first and second voltage sources, respectively, that satisfy the motor current command value, the motor voltage command value and a target charged power that is set based on conditions of the first and second voltage sources, and
  generating a PWM pulse for producing the output pulse based on the first and second output voltage command values,
the computing of the first and second output voltage command values including computing the output voltage command values, when the first voltage source is to be charged and the second voltage source is to be discharged, such that
  an electric power calculated based on a motor current command waveform corresponding to the motor current command value and a first output voltage command waveform corresponding to the first voltage source satisfies the target charged power, and a resultant voltage waveform of the first output voltage command waveform and a second output voltage command waveform corresponding to the second voltage source is coincident with a motor voltage command waveform corresponding to the motor voltage command value, and
  a location point of a positive peak of the motor current command waveform is positioned within time interval ranging from a location point of a negative peak of the first output voltage command waveform to a location point of a positive peak of the second output voltage command waveform existing within one period of the motor current command waveform.

* * * * *